(12) United States Patent  
Tong et al.

(10) Patent No.: US 12,276,890 B2  
(45) Date of Patent: Apr. 15, 2025

(54) DISPLAY PANEL HAVING SUPPORT STRUCTURES BEING FORMED IN VIA HOLES OF THE INTERLAYER INSULATING LAYER

(71) Applicant: BOE Technology Group Co., Ltd., Beijing (CN)

(72) Inventors: Binbin Tong, Beijing (CN); Lizhong Wang, Beijing (CN); Jianbo Xian, Beijing (CN); Liping Lei, Beijing (CN); Chunping Long, Beijing (CN); Yunping Di, Beijing (CN); Ce Ning, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/005,421

(22) PCT Filed: Mar. 30, 2022

(86) PCT No.: PCT/CN2022/084072  
§ 371 (c)(1),  
(2) Date: Jan. 13, 2023

(87) PCT Pub. No.: WO2023/134022  
PCT Pub. Date: Jul. 20, 2023

(65) Prior Publication Data  
US 2024/0272497 A1    Aug. 15, 2024

(30) Foreign Application Priority Data

Jan. 14, 2022 (CN) .......................... 202210041921.7

(51) Int. Cl.  
*G02F 1/1362*    (2006.01)  
*G02F 1/01*    (2006.01)  
(Continued)

(52) U.S. Cl.  
CPC ...... *G02F 1/136286* (2013.01); *G02F 1/0107* (2013.01); *G02F 1/133308* (2013.01);  
(Continued)

(58) Field of Classification Search  
CPC ........... G02F 1/136227; G02F 1/13394; G02F 1/0107; G02F 1/1339; G02F 1/13396  
See application file for complete search history.

(56) References Cited

U.S. PATENT DOCUMENTS 10,025,143 B2   7/2018   Yang et al.  
10,459,302 B2   10/2019   Zhang  
(Continued)

FOREIGN PATENT DOCUMENTS

CN    10-4880878    *   9/2015   ....... G02F 1/136286  
CN    104880878 A    9/2015  
(Continued)

OTHER PUBLICATIONS

Mar. 3, 2022—(CN) First Office Action Appn 202210041921.7.

*Primary Examiner* — Lauren Nguyen  
(74) *Attorney, Agent, or Firm* — Banner & Witcoff, Ltd.

(57) ABSTRACT

At least one embodiment of the present disclosure provides a display panel, and the display panel includes: a first substrate and a second substrate oppositely combined with each other, the first substrate includes a base substrate, and a gate line, a first electrode, a first interlayer insulating layer, and second electrode on the base substrate; the first interlayer insulating layer includes a first via hole penetrating through the first interlayer insulating layer, the second electrode is electrically connected to the first electrode the first via hole, first support structure is provided in a region corresponding to the first via hole and on a side of the second electrode away from the base substrate; at least a part of the first support structure is located in the first via hole, an (Continued)

orthographic projection of the first via hole overlaps with an orthographic projection of the gate line on the base substrate.

18 Claims, 10 Drawing Sheets

(51) Int. Cl.
  *G02F 1/1333* (2006.01)
  *G02F 1/1339* (2006.01)
  *G02F 1/1343* (2006.01)
(52) U.S. Cl.
  CPC ........ *G02F 1/1339* (2013.01); *G02F 1/13396* (2021.01); *G02F 1/13439* (2013.01)

(56) References Cited

U.S. PATENT DOCUMENTS

| | | | |
|---|---|---|---|
| 11,201,179 | B2 | 12/2021 | Ren et al. |
| 2014/0253850 | A1 | 9/2014 | Lee et al. |
| 2016/0041416 | A1* | 2/2016 | Zhang .................... G02B 7/006 438/151 |
| 2019/0103454 | A1 | 4/2019 | So et al. |
| 2019/0206894 | A1 | 7/2019 | Lee et al. |
| 2021/0215596 | A1 | 7/2021 | Liu et al. |
| 2021/0376285 | A1 | 12/2021 | Yan et al. |
| 2022/0376020 | A1 | 11/2022 | Yang et al. |

FOREIGN PATENT DOCUMENTS

| | | |
|---|---|---|
| CN | 105824160 A | 8/2016 |
| CN | 106684101 A | 5/2017 |
| CN | 107577100 A | 1/2018 |
| CN | 108008582 A | 5/2018 |
| CN | 108231671 A | 6/2018 |
| CN | 109659326 A | 4/2019 |
| CN | 110581144 A | 12/2019 |
| CN | 110930883 A | 3/2020 |
| CN | 111584600 A | 8/2020 |
| CN | 113192977 A | 7/2021 |
| CN | 113196374 A | 7/2021 |
| CN | 114068590 A | 2/2022 |
| KR | 1020080051627 | 6/2008 |

* cited by examiner

DISPLAY PANEL HAVING SUPPORT STRUCTURES BEING FORMED IN VIA HOLES OF THE INTERLAYER INSULATING LAYER

The application is a U.S. National Phase Entry of International Application PCT/CN2022/084072 filed on Mar. 30, 2022, designating the United States of America and claiming priority to Chinese Patent Application No. 202210041921.7, filed on Jan. 14, 2022. The present application claims priority to and the benefit of the above-identified applications and the above-identified applications are incorporated by reference herein in their entirety.

TECHNICAL FIELD

At least one embodiment of the present disclosure relates to a display panel.

BACKGROUND

Products with ultra-high PPI (such as PPI ranging from hundreds to thousands) are being developed by various manufacturers for use in virtual reality displays, sighting telescopes, and other markets and will gradually enter the view of users.

Taking virtual reality technology as an example, the virtual reality technology is a new technology that "seamlessly" integrates real world information and virtual world information. Compared with conventional display products, the most obvious feature of the virtual reality display products is that they have an ultra-high resolution. With the development of optoelectronic technology and semiconductor manufacturing technology, in a display device, for example, thin film transistor liquid crystal displays (TFT-LCD) occupy a dominant position in the current display market due to their superior characteristics such as high-quality image quality, high space utilization, low power consumption, no radiation, and the like.

SUMMARY

At least one embodiment of the present disclosure provides a display panel, the display panel is formed by positioning at least part of a first support structure in a first via hole, and enabling an orthographic projection of the first via hole on a base substrate at least partially overlaps with an orthographic projection of a gate electrode or a gate line on the base substrate, so as to improve the resolution and the aperture ratio of the display panel.

At least one embodiment of the present disclosure provides a display panel, and the display panel includes a first substrate and a second substrate that are oppositely combined with each other, in which the first substrate comprises a base substrate, and a gate line, a first electrode, a first interlayer insulating layer, and a second electrode sequentially disposed on the base substrate; the first interlayer insulating layer comprises a first via hole penetrating through the first interlayer insulating layer, the second electrode is electrically connected to the first electrode through the first via hole, and a first support structure is provided in a region corresponding to the first via hole and on a side of the second electrode away from the base substrate; and at least a part of the first support structure is located in the first via hole, and an orthographic projection of the first via hole on the base substrate at least partially overlaps with an orthographic projection of the gate line on the base substrate.

For example, in the display panel provided by at least one embodiment of the present disclosure, the first substrate is an array substrate, and the array substrate comprises the gate lines and data lines that are provided to be intersected with each other horizontally and vertically on the base substrate, and a plurality of pixel units; each of the plurality of pixel units comprises the first electrode, the second electrode, and the first interlayer insulating layer; the second electrode is in contact with a surface of the first interlayer insulating layer away from the base substrate, and the second electrode extends from an upper surface of the first interlayer insulating layer to a sidewall and a lower opening region of the first via hole and is connected to the first electrode located in the lower opening region.

For example, in the display panel provided by at least one embodiment of the present disclosure, the first interlayer insulating layer at least comprises a planarization layer, and the first via hole penetrates through the planarization layer.

For example, in the display panel provided by at least one embodiment of the present disclosure, a surface of the first support structure close to the second substrate is a plane or a concave surface recessed toward a side of the base substrate.

For example, in the display panel provided by at least one embodiment of the present disclosure, the first support structure extends downward within the first via hole to a lower opening region of the first via hole.

For example, in the display panel provided by at least one embodiment of the present disclosure, the first support structure extends upward within the first via hole to an upper opening region of the first via hole, and a top of the first support structure is higher than the upper surface of the first interlayer insulating layer.

For example, in the display panel provided by at least one embodiment of the present disclosure, each of the pixel units further comprises a third electrode located above the upper surface of the first interlayer insulating layer, and a second interlayer insulating layer is arranged between the third electrode and the second electrode on the upper surface of the first interlayer insulating layer; and the second interlayer insulating layer comprises an opening penetrating with the first interlayer insulating layer, and the first support structure extends toward the second substrate and comprises a protruding structure higher than the second interlayer insulating layer.

For example, in the display panel provided by at least one embodiment of the present disclosure, the third electrode comprises metal oxide strip-shaped portions spaced apart from each other on an upper surface of the second interlayer insulating layer, and a metal portion distributed between the metal oxide strip-shaped portions.

For example, in the display panel provided by at least one embodiment of the present disclosure, the third electrode comprises a metal portion and a metal oxide strip-shaped portion covering both a side surface and an upper surface of the metal portion, and the third electrode comprises a plurality of portions spaced apart from each other in a direction parallel to a main surface of the base substrate.

For example, in the display panel provided by at least one embodiment of the present disclosure, a cross-sectional shape, in a direction perpendicular to a main surface of the base substrate and a direction perpendicular to an extending direction of the gate line, of a portion of the first support structure extending beyond both the upper surface of the first interlayer insulating layer and an upper surface of the second interlayer insulating layer is a rectangle, a trapezoid, or a trapezoid-like shape with an upper surface of which is recessed toward a side of the base substrate.

For example, in the display panel provided by at least one embodiment of the present disclosure, the first support structure extends beyond the upper surface of the second interlayer insulating layer and extends toward the second substrate, and extends away from the first via hole along the upper surface of the second interlayer insulating layer.

For example, in the display panel provided by at least one embodiment of the present disclosure, each of the plurality of pixel units further comprises a thin film transistor, the thin film transistor comprises a semiconductor layer, and a source electrode and a drain electrode that are spaced apart from each other, and the source electrode and the drain electrode are connected to the semiconductor layer; the second electrode is a pixel electrode of one of the pixel units; and the first electrode is served as the drain electrode or as a connection electrode for connecting the drain electrode and the pixel electrode.

For example, in the display panel provided by at least one embodiment of the present disclosure, the first interlayer insulating layer at least comprises an organic flat layer, the second interlayer insulating layer at least comprises an inorganic insulating layer, and the third electrode is a common electrode of the one of the pixel units.

For example, in the display panel provided by at least one embodiment of the present disclosure, a material of the drain electrode comprises a transparent metal oxide conductive material.

For example, in the display panel provided by at least one embodiment of the present disclosure, a width d of an opening of the first via hole close to the upper surface of the first interlayer insulating layer satisfies: $d \leq (K1*M/PPI)*(1-AR*1/(1-Dmin*PPI/M))$, and M is a constant value of 25400 μm; PPI is a pixel density, the pixel density is an amount of pixel units per inch, and 1 inch=25400 μm; and a width of a single pixel unit is $P=M/PPI=25400$ μm/PPI, K1 is an aspect ratio of the single pixel unit, AR is an aperture ratio, PPI is the pixel density, and Dmin is a limit value of an exposure process.

For example, in the display panel provided by at least one embodiment of the present disclosure, the width d of the opening of the first via hole close to the upper surface of the first interlayer insulating layer satisfies: $d \approx (K1*M/PPI)*(1-AR)$.

For example, the display panel provided by at least one embodiment of the present disclosure, further comprises a thin film transistor, in which the thin film transistor comprises a source electrode and a drain electrode that are spaced apart from each other; and in a direction perpendicular to a main surface of the base substrate, an angle formed between an edge of the first via hole close to the source electrode and a plane where the main surface of the base substrate is located is α, an angle formed between an edge of the first via hole close to the drain electrode and the plane where the main surface of the base substrate is located is β, and α≥β.

For example, in the display panel provided by at least one embodiment of the present disclosure, α>β, and a range of a difference value of α−β is from 0.5° to 3°.

For example, in the display panel provided by at least one embodiment of the present disclosure, $D_{min} \leq W_{gate} \leq d$, d=2.0 μm~10 μm, and $D_{min}$=1.5 μm~2 μm.

For example, in the display panel provided by at least one embodiment of the present disclosure, a design of the first via hole satisfies that a range of an absolute value of $(d1-d2)-\tan \beta1*d3$ is from 0 to 1.5, d1 is a width of an opening of the first via hole away from a side of the base substrate, d2 is a width of an opening of the first via hole close to a side of the base substrate, d3 is a thickness of the first interlayer insulating layer, and β1 is an angle between the side wall of the first via hole and a surface of the base substrate parallel to the horizontal plane.

For example, in the display panel provided by at least one embodiment of the present disclosure, the first substrate further comprises a switching transistor disposed on the base substrate; the switching transistor is provided in a display region; and the switching transistor comprises a first insulating layer, a light-shielding layer, a second insulating layer, a metal oxide semiconductor layer, a gate insulating layer, a first gate electrode, a third insulating layer, a source electrode, a fourth insulating layer, and a first drain electrode that are sequentially stacked on the base substrate, the first electrode is electrically connected to the metal oxide semiconductor layer through a third via hole penetrating through the fourth insulating layer, the third insulating layer, and the gate insulating layer sequentially to serve as the first drain electrode, and the first source electrode is electrically connected to the metal oxide semiconductor layer through a fourth via hole penetrating through the third insulating layer and the gate insulating layer sequentially.

For example, in the display panel provided by at least one embodiment of the present disclosure, the first substrate further comprises a switching transistor disposed on the base substrate; the switching transistor is provided in a display region; the switching transistor comprises a light-shielding layer, a buffer layer, a first polysilicon layer, a gate insulating layer, a first gate electrode, a third insulating layer, a base electrode layer, a fourth insulating layer, a first drain electrode, a fifth insulating layer, and a first source electrode that are sequentially stacked on the base substrate, the base electrode layer comprises a first base electrode and a second base electrode that are provided opposite to each other, the first electrode is electrically connected to the first base electrode through a fifth via hole penetrating through the fourth insulating layer to serve as the first drain electrode, and the first base electrode is electrically connected to the first polysilicon layer through a sixth via hole penetrating through the third insulating layer and the gate insulating layer; and the first source electrode is electrically connected to the second base electrode through a seventh via hole penetrating through the fifth insulating layer and the fourth insulating layer sequentially, and the second base electrode is electrically connected to the first polysilicon layer through an eighth via hole penetrating through the third insulating layer and the gate insulating layer.

For example, in the display panel provided by at least one embodiment of the present disclosure, in a direction parallel to a main surface of the base substrate, a contact portion of the first electrode and the second electrode is located between the fifth via hole and the seventh via hole, and an orthographic projection of the contact portion of the first electrode and the second electrode on the base substrate at least partially overlaps with an orthographic projection of first gate electrode on the base substrate.

For example, in the display panel provided by at least one embodiment of the present disclosure, in the direction parallel to the main surface of the base substrate, a distance between a side of the contact portion of the first electrode and the second electrode close to the fifth via hole, and the sixth via hole is equal to a length of the first electrode not covering the first gate electrode.

For example, in the display panel provided by at least one embodiment of the present disclosure, in the direction parallel to the main surface of the base substrate, end points of two ends of the light-shielding layer are located between the seventh via hole and the fifth via hole, and the contact portion of the first electrode and the second electrode is located between the seventh via hole and an end point of the light-shielding layer close to the fifth via hole.

For example, in the display panel provided by at least one embodiment of the present disclosure, a second support structure is disposed on the second substrate, and a surface of the first support structure close to the second substrate is in contact with a surface of the second support structure close to the first substrate, or the surface of the first support structure close to the second substrate maintains a set distance from the surface of the second support structure close to the first substrate.

For example, in the display panel provided by at least one embodiment of the present disclosure, an orthographic projection of the second support structure on the base substrate at least partially overlaps with an orthographic projection of the first support structure on the base substrate.

For example, in the display panel provided by at least one embodiment of the present disclosure, an area of a contact surface between the second support structure and the first support structure is smaller than an area of a cross-section of a region of the second support structure or an area of a cross-section of a region of the first support structure close to the base substrate.

For example, in the display panel provided by at least one embodiment of the present disclosure, the first interlayer insulating layer comprises a second via hole penetrating through the first interlayer insulating layer, a third support structure is disposed in the second via hole, and an orthographic projection of the third support structure on the base substrate does not overlap with an orthographic projection of the second support structure on the base substrate.

For example, in the display panel provided by at least one embodiment of the present disclosure, the third support structure extends away from the base substrate to outside of the second via hole, and the third support structure fills the second via hole to allow that a shape of the third support structure in the second via hole conforms to a shape of the second via hole.

For example, in the display panel provided by at least one embodiment of the present disclosure, a shape of a longitudinal section of a portion of the third support structure extending out of the second via hole is a trapezoid.

For example, in the display panel provided by at least one embodiment of the present disclosure, a yield strength of the second support structure is greater than a product of an oppositely combined pressure when the first substrate and the second substrate are oppositely combined with each other and an area of a single second support structure and an amount of the second support structure.

For example, in the display panel provided by at least one embodiment of the present disclosure, both of the planarization layer and the first support structure are made of a light-transmitting material.

For example, in the display panel provided by at least one embodiment of the present disclosure, the first support structure is made of a light-shielding material, and an extending direction of the first support structure is parallel to an extending direction of the gate line.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

Figure 1:
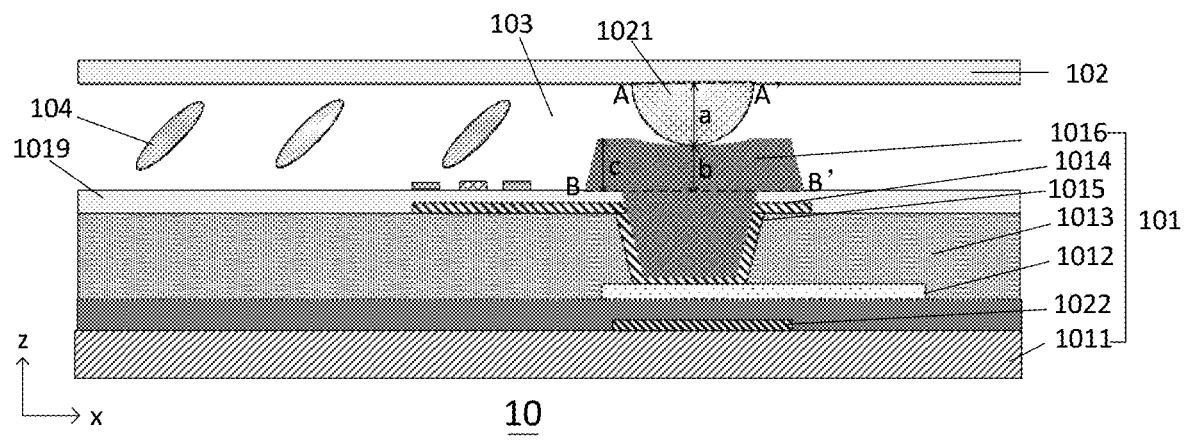
FIG. 1 is a schematic diagram of a cross-sectional structure of a display panel provided by at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment (s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "comprise," "comprising." etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On." "under," "left." "right" and the like are only used to indicate relative position relationship, and when the position of the object which is described is changed, the relative position relationship may be changed accordingly.

With the development of display technology, improving the resolution, aperture ratio and light efficiency of the display panel has become the focus of research by those skilled in the art in market segment fields such as VR displays, sighting telescopes, and the like.

The inventors of the present disclosure noticed that, generally, a first substrate included in a display panel is provided with an interlayer insulating layer, a via hole structure is provided in the interlayer insulating layer, an electrode is provided in the via hole structure, a support structure is provided in a region of the interlayer insulating layer where the via hole structure is not provided, and orthographic projections of gate lines on the base substrate do not overlap with the orthographic projection of the via hole structure on the base substrate, so that the resolution and the aperture ratio of the display panel are both low. Therefore, it may be considered to change the design of the display panel structure to improve the resolution and aperture ratio of the display panel.

The inventors of the present disclosure further noticed that, in a conventional design, the support structure is only disposed on a first substrate or a second substrate, in this case, it is easy to cause scratches to the display region corresponding to the first substrate or the display region corresponding to the second substrate in the process that the first substrate is oppositely combined with the second substrate. Therefore, it can be considered that a first support structure and a second support structure are respectively arranged on the first substrate and the second substrate, so that in the process that the first substrate is oppositely combined with the second substrate, a surface of the first support structure close to the second substrate is in contact with a surface of the second support structure close to the first substrate, so as to support the second substrate and form a gap between the first substrate and the second substrate, so as to avoid scratches to the display region corresponding to the first substrate or to the display region corresponding to the second substrate in the process that the first substrate is oppositely combined with the second substrate, thereby reducing the risk of edge light leakage.

At least one embodiment of the present disclosure provides a display panel, and the display panel can be applied to a high-resolution liquid crystal display panel. The display panel includes a first substrate (e.g., an array substrate) and a second substrate that are oppositely combined with each other, and a liquid crystal layer between the first substrate and the second substrate. The first substrate includes a base substrate, and a gate line, a first electrode, a first interlayer insulating layer, and a second electrode sequentially provided on the base substrate. The first interlayer insulating layer includes a first via hole penetrating through the first interlayer insulating layer, the second electrode is electrically connected to the first electrode through the first via hole, and a first support structure is provided in a region corresponding to the first via hole and on a side of the second electrode away from the base substrate. At least part of the first support structure is located in the first via hole, and an orthographic projection of the first via hole on the base substrate at least partially overlaps with an orthographic projection of the gate line on the base substrate. The embodiments of the present disclosure are implemented by positioning at least part of the first support structure in the first via hole, and enabling that the orthographic projection of the first via hole on the base substrate at least partially overlaps with the orthographic projection of the gate line on the base substrate, so as to improve the resolution and the aperture ratio of the display panel.

For example, FIG. 1 is a schematic diagram of a cross-sectional structure of a display panel provided by at least one embodiment of the present disclosure. As shown in FIG. 1, the display panel 10 includes a first substrate 101 and a second substrate 102 that are oppositely combined with each other. The first substrate 101 includes a base substrate 1011, and gate lines 1022, a first electrode 1012, a first interlayer insulating layer 1013, and a second electrode 1014 sequentially provided on the base substrate 1011. The first interlayer insulating layer 1013 includes a first via hole 1015 penetrating through the first interlayer insulating layer 1013, the second electrode 1014 is electrically connected to the first electrode 1012 through the first via hole 1015, and a first support structure 1016 is provided in a region corresponding to the first via hole 1015 and on a side of the second electrode 1014 away from the base substrate 1011. At least part of the first support structure 1016 is located in the first via hole 1015, and the orthographic projection of the first via hole 1015 on the base substrate 1011 at least partially overlaps with the orthographic projections of the gate lines 1022 on the base substrate 1011. For example, in the display panel 10 shown in FIG. 1, at least part of the first support structure 1016 is located in the first via hole 1015, and the orthographic projection of the first via hole 1015 on the base substrate 1011 at least partially overlaps with the orthographic projections of the gate lines 1022 on the base substrate 1011, thereby improving the resolution and the aperture ratio of the display panel 10.

For example, the first support structure 1016 includes a bottom portion close to the base substrate 1011, a top portion at a position opposite to the bottom portion, and side portions.

For example, it should be noted that the region where the first support structure 1016 is located corresponding to the first via hole 1015 may be a region where the first support structure 1016 at least partially overlaps with the first via hole 1015. In some embodiments, the orthographic projection of the first support structure 1016 on the base substrate is located in a region where the first support structure 1016 overlaps with the first via hole 1015. In other embodiments, a part of the orthographic projection of the first support structure 1016 on the base substrate is located in the region where the first support structure 1016 overlaps with the first via hole 1015, for example, the first support structure 1016 is located in an opening region of the first via hole 1015 and a region extending from the opening region of the first via hole 1015 to the outside.

Figure 2:
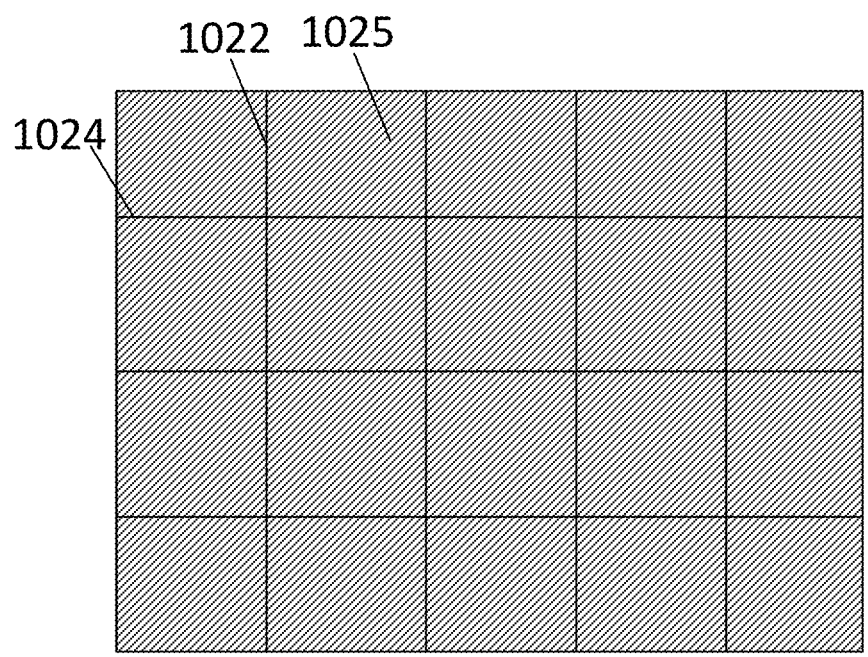
FIG. 2 is a schematic diagram of a planar structure of a first substrate provided by at least one embodiment of the present disclosure.

For example, FIG. 2 is a schematic diagram of a planar structure of a first substrate provided by at least one embodiment of the present disclosure. As shown in FIG. 2, the first substrate 101 is an array substrate, and the array substrate includes the gate lines 1022 and data lines 1024 that are provided to be intersected with each other horizontally and vertically on the base substrate 1011, and a plurality of pixel units 1025. As shown in FIG. 1 and FIG. 2, the pixel unit 1025 includes the first electrode 1012, the second electrode 1014, and the first interlayer insulating layer 1013 between the first electrode 1012 and the second electrode 1014, the second electrode 1014 is in contact with a surface of the first interlayer insulating layer 1013 away from the base substrate 1011, and the second electrode 1014 extends from an upper surface of the first interlayer insulating layer 1013 to the sidewalls and the lower opening region of the first via hole 1015, and is in contact with and is connected to the first electrode 1012 located in the lower opening region.

In some embodiments, the first interlayer insulating layer 1013 is a single-layer film layer, for example, a single-layer flat layer, and the material of the single-layer flat layer is an organic transparent film layer.

In some embodiments, the first interlayer insulating layer 1013 is a laminated insulating layer, and the laminated insulating layer has multiple layers (including two layers). The first interlayer insulating layer 1013 is a stack of an organic insulating layer and an inorganic insulating layer, or a stack of multiple inorganic insulating layers. For example, the stack of multiple layers of inorganic insulating layers is a stack of film layers containing different element types, such as a stack of silicon oxide and silicon nitride, or a stack of film layers containing the same type of element but with different molar ratios, for example, the respective film layers are all SixOy, but the values of x or y are different.

In some embodiments, as shown in FIG. 1, the first interlayer insulating layer 1013 is one flat layer with two main surfaces, and the two main surfaces are an upper surface and a lower surface respectively, the upper surface is away from the base substrate 1011, and the lower surface is closer to the base substrate 1011. The first interlayer insulating layer 1013 includes a first via hole 1015, and the first via hole 1015 includes sidewalls, an opening (may be referred to as an upper opening or an upper hole) close to the upper surface of the first interlayer insulating layer 1013, and an opening (may be referred to as a lower opening or a lower hole) close to the lower surface of the first interlayer insulating layer 1013.

In some embodiments, no other insulating layer is set on the first interlayer insulating layer 1013, and the first support structure 1016 is filled in the first via hole 1015 of the first interlayer insulating layer 1013 to support the first substrate 101 and the second substrate 102, thereby ensuring that the display panel has a cell thickness within a certain range.

In some embodiments, one or a plurality of insulating layers can be arranged on on the first interlayer insulating layer 1013, and the plurality of insulating layers are not provided with an opening or some film layers of the plurality of insulating layers are provided with openings that can expose the first support structure 1016. At least a part of the film layers cover the first support structure 1016, and the film layers are formed on the first interlayer insulating layer 1013 according to the shape of the first support structure 1016, so that the height of the first support structure 1016 can still play a role of supporting the first substrate 101 and the second substrate 102 even if it is covered with other film layers, and a cumulative thickness of other film layers to be covered needs to be considered when designing the support height of the first support structure 1016.

In one embodiment, the first support structure 1016 extends toward the second substrate 102 and includes a protruding structure higher than the second interlayer insulating layer 1019.

In one embodiment, a second interlayer insulating layer 1019 is formed on the first interlayer insulating layer 1013. In the case where the second interlayer insulating layer 1019 is formed on the first interlayer insulating layer 1013 by a deposition method, one embodiment is that the second interlayer insulating layer 1019 is also located in the first via hole 1015, and another embodiment is that a region of the second interlayer insulating layer 1019 corresponding to the first via hole 1015 is removed and only a portion of the upper surface of the first interlayer insulating layer 1013 remains.

Whether the region of the second interlayer insulating layer 1019 corresponding to the first via hole 1015 is removed or not, the second interlayer insulating layer 1019 is formed on the first interlayer insulating layer 1013 including the first via hole 1015 by a deposition method, a similar via hole is formed, and the via hole still has a hole wall shape almost similar to the first via hole 1015, an upper opening and a lower opening at about the same positions as the first via hole 1015, that is, the similar via hole is formed according to the shape of the first via hole 1015. Correspondingly, the second interlayer insulating layer 1019 also includes an upper surface, a lower surface, a via hole, an opening close to the upper surface, and an opening close to the lower surface.

For example, as shown in FIG. 2, the pixel unit 1025 is located in the pixel region defined by the gate lines 1022 and the data lines 1024 that are provided to be intersected with each other horizontally and vertically, and a pixel structure is provided in the pixel unit 1025.

For example, in an example, the first interlayer insulating layer 1013 at least includes a planarization layer, the first via hole 1015 is a through hole penetrating through the planarization layer, and the planarization layer plays a role of planarization and reduces the parasitic capacitance between electrodes or signal lines, so that the electrical signal in the display panel is more stable.

In an example, the planarization layer included in the first interlayer insulating layer 1013 and the first support structure 1016 are made of a light transmitting material, such as organic resin, to improve the light transmittance of the display panel. The first support structure 1016 made of the light-transmitting material has a large degree of freedom in the design size, and is not restricted by the gate lines arranged below.

In another example, the first support structure 1016 is made of a light shielding material, the light shielding material can effectively reduce the light leakage phenomenon in the region where the first support structure 1016 is located, but in order to improve the aperture ratio, the orthographic projection of the first support structure on the base substrate is located in the orthographic projections of the gate lines, which are below the first support structure, on the base substrate.

In some embodiments, the first support structure 1016 is located above the gate lines and is at least filled in the first via hole 1015. The first support structure 1016 extends toward the width direction and the length direction of the gate lines 1022 when the first support structure 1016 extends on the upper surface of the first interlayer insulating layer 1013 or the second interlayer insulating layer 1019. In some embodiments, the first support structure 1016 is beyond the edge of the gate lines 1022 in the width direction, or is also located in the outline of the gate lines 1022. In some embodiments, the first support structure 1016 extends toward the length direction of the gate lines 1022, for example, parallel to the extending direction of the gate lines 1022.

A plurality of first support structures 1016 may be provided on one of the gate lines 1022, for example, one first support structure 1016 is provided corresponding to one pixel unit. Then, the adjacent first support structures 1016 may be separated from each other and independently arranged, or may be connected to each other, for example, connected by the extension portion of the first support structures 1016.

For example, in an example, the surface of the first support structure 1016 close to the second substrate 102 is a plane or a concave surface recessed toward the base substrate 1011. In the structure shown in FIG. 1, the surface of the first support structure 1016 close to the second substrate 102 is a concave surface recessed toward the base substrate 1011.

For example, it should be noted that the surface of the first support structure 1016 close to the second substrate 102 is also a convex surface that protrudes toward the second substrate 102.

For example, as shown in FIG. 1, a second support structure 1021 is further provided between the first substrate 101 and the second substrate 102 to cooperate with the first support structure 1016 to support the first substrate 101 and the second substrate 102. One of the first support structure 1016 and the second support structure 1021 is located on the first substrate 101 and the other of the first support structure 1016 and the second support structure 1021 is located on the second substrate 102, and the first support structure 1016 and the second support structure 1021 are in contact with each other or maintain a certain distance when the first substrate 101 and the second substrate 102 are oppositely combined with each other. Furthermore, a space for accommodating the liquid crystal layer 104 is defined between the first substrate 101 and the second substrate 102, and the shapes of the contact positions of the first support structure 1016 and the second support structure 1021 are adapted to each other. For example, if the surface of the first support structure 1016 close to the second substrate 102 is a concave surface or a plane, the surface of the second support structure 1021 close to the first substrate 101 is a convex surface or plane; if the surface of the first support structure 1016 close to the second substrate 102 is a convex surface or a plane, the surface of the second support structure 1021 close to the first substrate 101 is a concave surface or a plane.

It should be noted that, in the embodiments of the present disclosure, the surface of the first support structure 1016 close to the second substrate 102 being in contact with the surface of the second support structure 1021 close to the first substrate 101 refers to that the top surface of the first support structure 1016 and the top surface of the second support structure 1021 are in contact with each other at least in partial regions, so that there is a maximum gap between the first substrate 101 and the second substrate 102 in the direction perpendicular to the main surface of the base substrate 1011; or, the surface of the first support structure 1016 close to the second substrate 102 being in contact with the surface of the second support structure 1021 close to the first substrate 101 also refers to that a part of other positions of the first support structure 1016 close to the surface of the second substrate 102 is in contact with a part of other positions of the second support structure 1021 close to the surface of the first substrate 101, as long as there is a gap between the first substrate 101 and the second substrate 102, and when the first substrate 101 and the second substrate 102 are oppositely combined with each other, the display region corresponding to the first substrate 101 or the display region corresponding to the second substrate 102 is not scratched, and the problem of light leakage in the edge region will not occur, and by providing the first support structure 1016 in the region corresponding to the first via hole 1015, the problem of light leakage caused by the first via hole 1015 can be avoided.

For example, in an example, the first support structure 1016 fills the first via hole 1015 of the first interlayer insulating layer 1013 completely and protrudes out of the first via hole 1015, and the surface of the first support structure 1016 close to the second substrate 102 is a concave surface, and the concave surface increases the area of the surface of the first support structure 1016 close to the second substrate 102, so that the contact area between the first support structure 1016 and the second support structure 1021 is increased, the effective support area of the first support structure 1016 for the second substrate 102 is increased, and the risk of the second support structure 1021 sliding from the first substrate 101 is reduced. Furthermore, most of the first support structure 1016 is located in the first via hole 1015. For example, in an example, a height of the first support structure 1016 is about 0.6 μm, which can meet the requirement of the display panel for the size of the gap.

For example, the area of the contact surface between the second support structure 1021 and the first support structure 1016 is smaller than the area of a cross-section of a region of the second support structure 1021 or the first support structure 1016 close to the base substrate 1011.

It should be noted that the second substrate 102 includes a base and film layer structures disposed on the base.

For example, as shown in FIG. 1, the surface of the first support structure 1016 close to the second substrate 102 is recessed toward the base substrate 1011, and the surface of the second support structure 1021 close to the first substrate 101 protrudes toward the first substrate 101. The structural design can allow the second support structure 1021 to be in contact with the recessed portion of the first support structure 1016, so that the second support structure 1021 must move upward before sliding from the first substrate 101, and the design can enable the second support structure 1021 less likely to slip from the first support structure 1016, so that the size, which is perpendicular to the main surface of the base substrate 1011, of the gap 103 between the first substrate 101 and the second substrate 102 is kept constant. As shown in FIG. 1, the size, which is perpendicular to the main surface of the base substrate 1011, of the gap 103 between the first substrate 101 and the second substrate 102 is a+b, and thus smaller than the size a+c, where a is a maximum size of the second support structure 1021 perpendicular to the main surface of the base substrate 1011, b is a minimum distance from the surface of the first support structure 1016 away from the base substrate 1011 to the surface of the first via hole 1015 away from the base substrate 1011, and c is a maximum distance from the surface of the first support structure 1016 away from the base substrate 1011 to the surface of the first via hole 1015 away from the base substrate 1011.

For example, in an example, the cell thickness of the liquid crystal is a+b, and c>b, and the cell thickness of the liquid crystal affects the response speed of the liquid crystal. The minimum value $a_{min}$ of the height of the second support structure 1021 is determined by the process conditions, and $a_{min}$=1 μm.

For example, in an example, the cell thickness of the liquid crystal is 1.6 μm, $a_{min}$=1 μm, the maximum value of b is 0.6 μm, the a increases, the value of b decreases, and the minimum value of b ranges from 0 to 0.6 μm. Preferably, the value of b ranges from 0.30 μm to 0.45 μm.

For example, as shown in FIG. 1, the surface of the first support structure 1016 close to the second substrate 102 is in contact with the surface of the second support structure 1021 close to the first substrate 101 to support the second substrate 102 and form a gap between the first substrate 101 and the second substrate 102.

For example, as shown in FIG. 1, the orthographic projection of the second support structure 1021 on the base substrate 1011 at least partially overlaps with the orthographic projection of the first support structure 1016 on the base substrate 1011.

For example, as shown in FIG. 1, a cross-sectional shape of the second support structure 1021 on a plane perpendicular to the main surface of the base substrate 1011 is a semicircle.

For example, in an example, a yield strength of the second support structure 1021 is greater than a product of an oppositely combined pressure when the first substrate 101 and the second substrate 102 are oppositely combined with each other and the area of a single second support structure 1021 and the amount of the second support structure 1021.

It should be noted that the yield strength of the second support structure 1021 refers to the maximum pressure of elastic deformation of the material of the second support structure 1021, so as to prevent the plastic deformation of the second support structure 1021 from affecting the effect of oppositely combining the first substrate 101 and the second substrate 102 in the process of oppositely combining the first substrate 101 and the second substrate 102.

Figure 3:
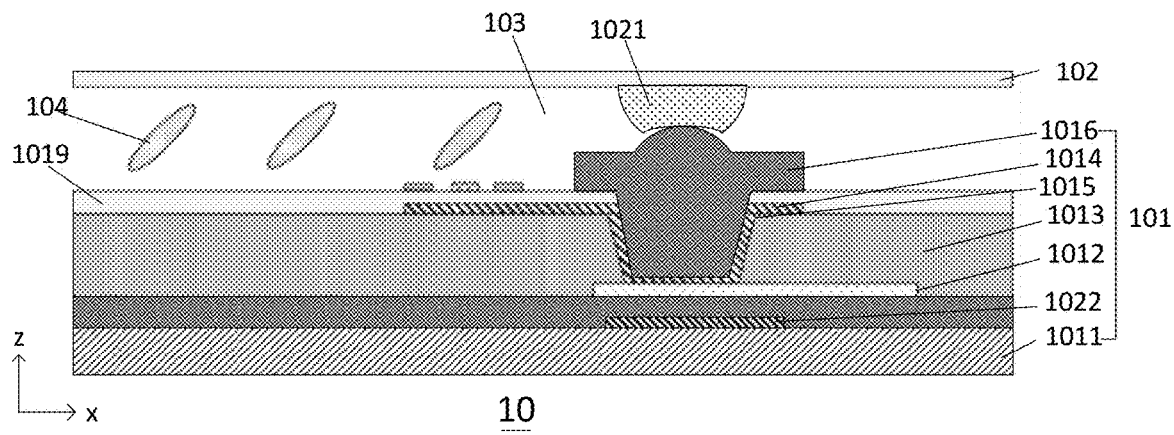
FIG. 3 is a schematic diagram of a cross-sectional structure of another display panel provided by at least one embodiment of the present disclosure.

For example, FIG. 3 is a schematic diagram of a cross-sectional structure of another display panel provided by at least one embodiment of the present disclosure. As shown in FIG. 3, the surface of the first support structure 1016 close to the second substrate 102 is a convex surface, the surface of the second support structure 1021 close to the first substrate 101 is a concave surface, and the convex surface of the first support structure 1016 rests against the concave surface of the second support structure 1021. The structural design can allow the recessed portion of the second support structure 1021 to be in contact with the convex portion of the first support structure 1016, so that the second support structure 1021 must move upward before sliding from the first substrate 101, and the design can enable the second support structure 1021 less likely to slip from the first support structure 1016, so that the size, which is perpendicular to the main surface of the base substrate 1011, of the gap 103 between the first substrate 101 and the second substrate 102 is kept constant.

It should be noted that the surface of the first support structure 1016 close to the second substrate 102 may also be a plane substantially parallel to the base substrate 1011.

For example, as shown in FIG. 1 and FIG. 3, the second support structures 1021 and the first support structures 1016 are in one-to-one correspondence, that is, each of the first support structures 1016 is in contact with one of the second support structures 1021 correspondingly, and each of the second support structures 1021 is in contact with one of the first support structures 1016 correspondingly, so that the amount of the second support structures 1021 is equal to the amount of the first support structures 1016.

For example, as shown in FIG. 1, the orthographic projection of the second support structure 1021 on the base substrate 1011 at least partially overlaps with the orthographic projection of the first support structure 1016 on the base substrate 1011. For example, in an example, the orthographic projection of the second support structure 1021 on the base substrate 1011 is in the orthographic projection of the first support structure 1016 on the base substrate 1011. The cross-sectional shape of the second support structure 1021 on a plane perpendicular to the main surface of the base substrate 1011 is axisymmetric about an axis parallel to the z-axis along a connection line A-A' between two end points A and A' of the x-axis, the cross-sectional shape of the first support structure 1016 on the plane perpendicular to the main surface of the base substrate 1011 is axisymmetric about an axis parallel to the z-axis along a connection line B-B' between two end points B and B' of the x-axis, the connection line A-A' is parallel to the connection line B-B', and the length of the connection line A-A' is less than the length of the connection line B-B'.

For example, as shown in FIG. 1, the cross-sectional shape of the second support structure 1021 on a plane perpendicular to the main surface of the base substrate 1011 and in a direction perpendicular to the gate line is a semicircle, so that the contact between the second support structure 1021 and the first support structure 1016 is line contact. The embodiments of the present disclosure are not limited thereto, the cross-sectional shape of the second support structure 1021 on the plane perpendicular to the main surface of the base substrate 1011 may also be a rectangle, a triangle, etc., and the contact between the second support structure 1021 and the first support structure 1016 may also be surface contact, etc., which are not limited in the embodiments of the present disclosure.

For example, in the structures shown in FIG. 1 and FIG. 3, the first substrate 101 is an array substrate, and the second substrate 102 is a color filter substrate, or the first substrate is an array substrate and a color filter function layer is located on the array substrate, also called as a COA (color film on an array) substrate, and the second substrate 102 is an opposite substrate.

The following embodiments take the case where the first substrate 101 is the array substrate, the second substrate 102 is the color filter substrate, and the liquid crystal layer 104 is arranged in the gap 103 between the first substrate 101 and the second substrate 102 as an example for description. However, the embodiments of the present disclosure are not limited thereto, as long as the finally formed structure can satisfy the function of the display.

For example, as shown in FIG. 1 and FIG. 3, the first interlayer insulating layer 1013 includes an upper surface and a lower surface, and the first via hole 1015, and the first via hole 1015 includes sidewalls, an opening close to the upper surface of the first interlayer insulating layer 1013, and an opening close to the lower surface of the first interlayer insulating layer 1013.

For example, as shown in FIG. 1 and FIG. 3, the first support structure 1016 extends downward in the first via hole 1015 to the lower opening region of the first via hole 1015.

For example, as shown in FIG. 1 and FIG. 3, the first support structure 1016 extends upward from the bottom of the first via hole 1015 of the first interlayer insulating layer 1013, that is, extends in a direction away from the main surface of the base substrate 1011 to fill the first via hole

1015 and continues to extend out of an opening of the first via hole 1015 close to the upper surface of the first interlayer insulating layer, and the first support structure 1016 extends out of the first via hole 1015 on the upper surface of the first interlayer insulating layer 1013, and the portion extending out of the first via hole 1015 overlaps with the upper surface of the first interlayer insulating layer 1013.

It should be noted that, the display panel 10 is not limited to the structures shown in FIG. 1 and FIG. 3, if no other insulating layer is provided on the first interlayer insulating layer 1013, the first support structure 1016 is in contact with the upper surface of the first interlayer insulating layer 1013. If other insulating layers are provided on the first interlayer insulating layer 1013, such as a second interlayer insulating layer is provided on the first interlayer insulating layer 1013, the first support structure 1016 is in contact with the upper surface of the second interlayer insulating layer. The first support structure 1016 extends upward from the bottom of the first via hole 1015 of the first interlayer insulating layer 1013, that is, extends in the direction away from the main surface of the base substrate 1011 to fill the first via hole 1015 and continues to extend to the upper opening region of the upper surface of the first via hole 1015 close to the first interlayer insulating layer 1013, and continues to extend upward beyond the upper surface of the second interlayer insulating layer, so that at least a part of the first support structure 1016 is located outside the first via hole 1015 of the first interlayer insulating layer 1013 and in contact with the upper surface of the second interlayer insulating layer, thereby allowing the volume of each first support structure 1016 larger, and the area of the surface of the first support structure 1016 away from the base substrate 1011 is larger, so that the second support structure 1021 is in contact with the first support structure 1016 more stably, and the gap 103 between the first substrate 101 and the second substrate 102 is more constant.

As shown in FIG. 1 and FIG. 3, the recessed portion of the first support structure 1016 is located in the middle region of the cross-sectional shape of the first support structure 1016 on the plane perpendicular to the main surface of the base substrate 1011. The surface of the first support structure 1016 away from the base substrate 1011 is axisymmetric about the z-axis, if the coordinate axis is translated, the position of the surface of the first support structure 1016 away from the base substrate 1011 closest to the base substrate 1011 is the intersection of the x-axis and the z-axis, and the recessed portion of the first support structure 1016 is axisymmetric about the z-axis.

For example, a plurality of the first via holes 1015 are provided in gate line regions corresponding to a plurality of pixel units 1025, and one pixel unit 1025 corresponds to one above-mentioned first via hole 1015 and one first support structure 1016 corresponding to the first via hole 1015. The first via hole 1015 is a connection hole between a drain electrode of a thin film transistor and a pixel electrode in the pixel unit 1025.

For example, a first electrode 1012 in the first via hole 1015 is connected to the drain electrode of the thin film transistor in the pixel unit 1025, or the first electrode 1012 directly serves as the drain electrode of the thin film transistor and is connected to the semiconductor layer of the thin film transistor.

Figure 4:
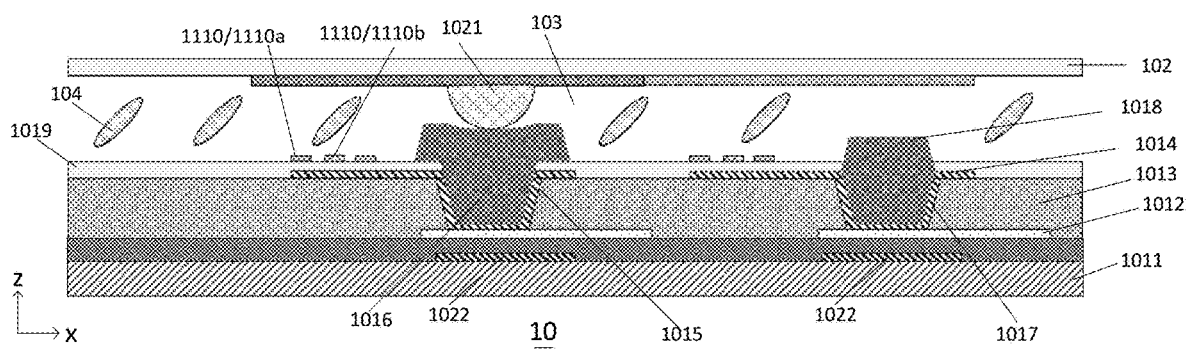
FIG. 4 is a schematic diagram of a cross-sectional structure of still another display panel provided by at least one embodiment of the present disclosure.

For example, FIG. 4 is a schematic diagram of a cross-sectional structure of still another display panel provided by at least one embodiment of the present disclosure. As shown in FIG. 4, a second interlayer insulating layer 1019 is further provided on the side of the first interlayer insulating layer 1013 away from the base substrate 1011, and the first support structure 1016 is in contact with the upper surface of the second interlayer insulating layer 1019. The first support structure 1016 extends upward from the bottom of the first via hole 1015 of the first interlayer insulating layer 1013, that is, extends in the direction away from the main surface of the base substrate 1011 to fill the first via hole 1015 and continues to extend to the upper opening region of the first via hole 1015 close to the upper surface of the first interlayer insulating layer 1013, and continues to extend upward beyond the second interlayer insulating layer 1019. The pixel unit 1025 further includes a third electrode 1110 located on the upper surface of the second interlayer insulating layer 1019, that is, the second interlayer insulating layer 1019 is provided between the third electrode 1110 and the second electrode 1014 on the upper surface of the first interlayer insulating layer 1013. The second interlayer insulating layer 1019 includes an opening that penetrates with the first via hole 1015 in the first interlayer insulating layer 1013, and the first support structure 1016 extends toward the second substrate 102 and has a protruding structure higher than the second interlayer insulating layer 1019.

For example, as shown in FIG. 4, the third electrode 1110 includes metal oxide strip-shaped portions 1110*a* spaced apart from each other on the upper surface of the second interlayer insulating layer 1019, and metal portions 1110*b* distributed between the metal oxide strip-shaped portions 1110*a*. For example, the material of the metal portion 1110*b* includes conductive metal, such as copper metal, molybdenum metal, and other materials with light-shielding properties and conductive properties, and the material of the metal oxide strip-shaped portions 1110*a* includes a transparent conductive material, such as indium tin oxide and so on. The metal portion 1110*b* is capable of reducing the crosstalk of light in different pixel regions to improve light efficiency.

For example, in an example, the first electrode 1012 is a drain electrode of the thin film transistor, and in an embodiment, the drain electrode is in direct contact with the metal oxide semiconductor layer, such as an overlap connection. In another embodiment, the drain electrode is a region where the metal oxide semiconductor layer is partially conductorized.

For example, the second electrode 1014 is a pixel electrode, and the third electrode 1110 is a common electrode of the pixel unit.

For example, as shown in FIG. 4, the materials of the first electrode 1012 and the second electrode 1014 are transparent metal oxide conductor materials. The metal oxide strip-shaped portions 1110*a* included in the third electrode 1110 are conductors rather than semiconductors. The metal portions 1110*b* included in the third electrode 1110 are capable of blocking light, thereby reducing the cross color of light of different colors along the z-axis direction, and the metal portions 1110*b* can further function as a black matrix along the x-axis direction, so that it is not necessary to fabricate the black matrix along the x-axis direction when forming the second substrate 102, but only a black matrix along the y-axis direction that intersects the x-axis direction in a direction parallel to the main surface of the base substrate 1011 is fabricated. Because the black matrices in the x-axis direction and the y-axis direction are fabricated in different processes in the conventional process of fabricating the black matrices, the process steps for forming the black matrices along the x-axis direction on the second substrate 102 are reduced.

Figure 5:
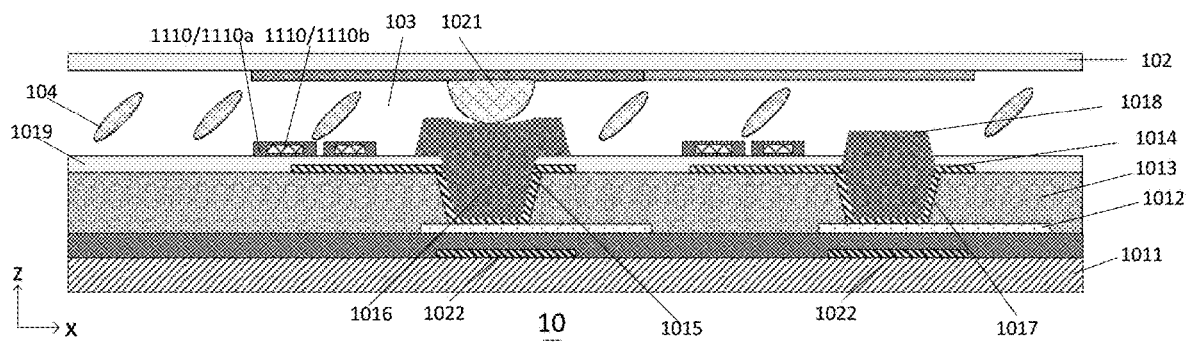
FIG. 5 is a schematic diagram of a cross-sectional structure of still another display panel provided by at least one embodiment of the present disclosure.

For example, FIG. 5 is a schematic diagram of a cross-sectional structure of still another display panel provided by at least one embodiment of the present disclosure. As shown in FIG. 5, the third electrode 1110 includes a metal portion 1110b and a metal oxide strip-shaped portion 1110a covering the side surface and the upper surface of the metal portion 1110b, and in the direction parallel to the main surface of the base substrate 1011, the third electrode 1110 includes a plurality of portions spaced apart from each other. That is, the metal portion 1110b and the metal oxide strip-shaped portion 1110a covering both the side surface of the metal portion 1110b and a surface of the metal portion 1110b away from the base substrate 1011 form a combination, and a plurality of the combinations are spaced apart from each other.

Figure 6:
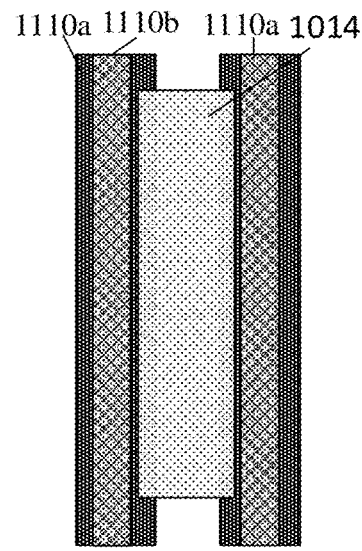
FIG. 6 is a perspective diagram of the second electrode and the third electrode in the cross-sectional structure shown in FIG. 5.

For example, FIG. 6 is a perspective diagram of the second electrode and the third electrode in the cross-sectional structure shown in FIG. 5. As shown in FIG. 6, the metal portion 1110b serving as the common electrode and the metal oxide strip-shaped portion 1110a are stacked in contact with each other. The orthographic projection of the metal portion 1110b on the base substrate 1011 is located in the orthographic projection of the metal oxide strip-shaped portion 1110a on the base substrate 1011, and the orthographic projection of the second electrode 1014 on the base substrate 1011 at least partially overlaps with the orthographic projection of the metal oxide strip-shaped portion 1110a on the base substrate 1011. The orthographic projection of the second electrode 1014 on the base substrate 1011 bridges between the orthographic projections of the adjacent metal oxide strip-shaped portions 1110a on the base substrate 1011.

For example, as shown in FIG. 1, FIG. 4, and FIG. 5, the cross-sectional shape, which is perpendicular to the main surface of the base substrate 1011 and in a direction perpendicular to the extending direction of the gate line 1022, of the portion of the first support structure 1016 that is beyond the upper surface of the first interlayer insulating layer 1013 and the upper surface of the second interlayer insulating layer 1019 is a trapezoid-like structure in which the upper surface is recessed toward one side close to the base substrate 1011. As shown in FIG. 3, the cross-sectional shape, which is perpendicular to the main surface of the base substrate 1011 and in a direction perpendicular to the extending direction of the gate line 1022, of the portion of the first support structure 1016 that is beyond the upper surface of the first interlayer insulating layer 1013 and the upper surface of the second interlayer insulating layer 1019 is a trapezoid-like structure in which the upper surface is protruded toward one side away from the base substrate 1011. In other examples, the cross-sectional shape, which is perpendicular to the main surface of the base substrate 1011 and in a direction perpendicular to the extending direction of the gate line 1022, of the portion of the first support structure 1016 that is beyond the upper surface of the first interlayer insulating layer 1013 and the upper surface of the second interlayer insulating layer 1019 is also a rectangle, a trapezoid, or the like, which is not limited in the embodiments of the present disclosure.

For example, as shown in FIG. 1, FIG. 3, FIG. 4, and FIG. 5, the first support structure 1016 extends beyond the upper surface of the second interlayer insulating layer 1019 and extends toward the second substrate 102, and extends away from the first via hole 1015 along the upper surface of the second interlayer insulating layer 1019. That is, the first support structure 1016 extends beyond the upper surface of the second interlayer insulating layer 1019 in the direction perpendicular to the main surface of the base substrate 1011, and further extends in the direction parallel to the main surface of the base substrate 1011. The portion of the first support structure 1016 extending in the direction parallel to the main surface of the base substrate 1011 is in contact with the upper surface of the second interlayer insulating layer 1019, so that the orthographic projection of the first support structure 1016 on the base substrate 1011 covers and exceeds the orthographic projection region of the first via hole 1015 on the base substrate 1011.

For example, as shown in FIG. 4 and FIG. 5, the first interlayer insulating layer 1013 further comprises a second via hole 1017 penetrating through the first interlayer insulating layer 1013, a third support structure 1018 is provided in the second via hole 1017, and the second via hole 1017 corresponds to the third support structure 1018.

For example, the second via hole 1017 is similar to the first via hole 1015, and is arranged in the region of the pixel unit 1025 where the gate line 1022 is arranged, and one pixel unit 1025 corresponds to one second via hole 1017 and one corresponding third support structure 1018. The second via hole 1017 is a connection hole for connecting a drain electrode of a thin film transistor and a pixel electrode in the pixel unit 1025.

For example, the first via hole 1015 and the second via hole 1017 are holes in different regions, and correspond to the thin film transistors in different regions, the shape of the first via hole 1015 is the same as or different from the shape of the second via hole 1017, and the size of the first via hole 1015 is the same as or different from the size of the second via hole 1017, but the first support structure 1016 is different from the third support structure 1018. For example, the first support structure 1016 cooperates with the second support structure 1021 to support the first substrate 101 and the second substrate 102, but the third support structure 1018 is configured to support the first substrate 101 and the second substrate 102 separately. Alternatively, the shape of the first support structure 1016 is different from the shape of the third support structure 1018. The first via hole 1015 is a hole corresponding to the first support structure 1016, and the second via hole 1017 is a hole corresponding to the third support structure 1018, but it does not mean that there is a structural difference between the first via hole 1015 and the second via hole 1017. In some embodiments, the arrangement positions of the first via hole 1015 and the second via hole 1017 are located in the regions corresponding to the gate lines 1022, and the size and the shape of the first via hole 1015 are similar as those of the second via hole 1017.

For example, in the structures shown in FIG. 4 and FIG. 5, the display panel 10 includes two pixel units, and each of the pixel units is correspondingly provided with one first via hole 1016 or one second via hole 1017. There is one first electrode 1012, one second electrode 1014, and one thin film transistor for each of the pixel units.

For example, as shown in FIG. 4 and FIG. 5, the third support structure 1018 is provided in the region corresponding to the second via hole 1017 and on the side of the second electrode 1014 away from the base substrate 1011. The orthographic projection of the third support structure 1018 on the base substrate 1011 does not overlap with the orthographic projection of the second support structure 1021 on the base substrate 1011, because the third support structure 1018 only cooperates with the first support structure 1016 to form a larger support structure to support the first substrate 101 and the second substrate 102 to ensure a cell thickness of the liquid crystal cell. The second support structure 1021 does not cooperate with the third support structure 1018 and does not extend to the region where the third support structure 1018 is located. The third support structure 1018 can at least fill in the second via hole 1017 to reduce the risk of light leakage from the second via hole 1017.

For example, as shown in FIG. 4 and FIG. 5, the third support structure 1018 extends away from the base substrate 1011 to the outside of the second via hole 1017, and the third support structure 1018 fills the second via hole 1017, so that the shape of the portion of the third support structure 1018 in the second via hole 1017 is adapted to the shape of the second via hole 1017. As shown in FIG. 4 and FIG. 5, the third support structure 1018 extends out of the second via hole 1017 in the direction perpendicular to the main surface of the base substrate 1011, that is, extends out of the second via hole 1017 in a direction parallel to the z-axis, and the maximum size of the third support structure 1018 in the direction parallel to the main surface of the base substrate 1011 is equal to the maximum size of the second via hole 1017 in the direction parallel to the main surface of the base substrate 1011. On a plane perpendicular to the main surface of the base substrate 1011 and in a direction parallel to the x-axis, the connection line between the two farthest end points of the third support structure 1018 is the connection line between the two points of the third support structure 1018 that are in contact with the second electrode 1014, that is, the connection line of the largest opening of the surface of the first interlayer insulating layer 1013 away from the base substrate 1011 along the x-axis direction.

For example, as shown in FIG. 4 and FIG. 5, the third support structure 1018 extends upward from the second via hole 1017 and continues to extend upward beyond the second via hole 1017, and extends to the upper surface of the film layer (for example, the first interlayer insulating layer 1013) where the second via hole 1017 is located.

For example, as shown in FIG. 4 and FIG. 5, the first via hole 1015 and the second via hole 1017 are formed in the same process step. The first via hole 1015 and the second via hole 1017 can be formed by using the same mask to perform a patterning process, and the first via hole 1015 and the second via hoe 1017 have the same shape and the same size.

For example, as shown in FIG. 4 and FIG. 5, the shape of the longitudinal section of the portion of the third support structure 1018 extending out of the second via hole 1017 is a trapezoid. For example, as shown in FIG. 4 and FIG. 5, on the plane perpendicular to the main surface of the base substrate 1011, the cross-sectional shape of the portion of the third support structure 1018 extending along the direction perpendicular to the main surface of the base substrate 1011 to the outside of the second via hole 1017 is a trapezoid, and in this way, the size, in the x-axis direction, of the cross-sectional shape, on the plane perpendicular to the main surface of the base substrate 1011, of the third support structure 1018 first increases and then decreases along the z-axis direction and from a position close to the base substrate 1011 to a position away from the base substrate 1011.

For example, as shown in FIG. 4 and FIG. 5, the second electrode 1014 is in surface contact with the first electrode 1012 at the surface of the first via hole 1015 close to the base substrate 1011 to be electrically connected to each other, and the second electrode 1014 is in surface contact with the first electrode 1012 at the surface of the second via hole 1017 close to the base substrate 1011 to be electrically connected to each other, thereby ensuring the stability of the connection between the first electrode 1012 and the second electrode 1014. The second electrode 1014 can also completely cover the surface of the first via hole 1015 and the surface of the second via hole 1017 close to the base substrate 1011.

For example, as shown in FIG. 4 and FIG. 5, the second interlayer insulating layer 1019 is further provided between the third support structure 1018 and the second electrode 1014, and the second interlayer insulating layer 1019 is provided with a via hole that communicates with the second via hole 1017, and a third electrode 1110 is provided in the periphery of the third support structure 1018 and on the side of the second interlayer insulating layer 1019 away from the base substrate 1011. The second interlayer insulating layer 1019 may be formed on the side of the first support structure 1016 and the third support structure 1018 close to the base substrate 101, or may be formed on the side of the first support structure 1016 and the third support structure 1018 away from the base substrate 1011, which is not limited in the embodiment of the present disclosure.

For example, as shown in FIG. 4 and FIG. 5, the third support structure 1018 extends to outside of the second via hole 1017 in the direction perpendicular to the main surface of the base substrate 1011, and a largest size of the third support structure 1018 in the direction parallel to the main surface of the base substrate 1011 is equal to a largest size of the second via hole 1017 in the direction parallel to the main surface of the base substrate 1011.

For example, as shown in FIG. 4 and FIG. 5, the cross-sectional shape, on the plane perpendicular to the main surface of the base substrate 1011, of the portion of the third support structure 1018 extending to outside of the second via hole 1017 along the direction perpendicular to the main surface of the base substrate 1011 is a trapezoid.

For example, as shown in FIG. 4 and FIG. 5, the first interlayer insulating layer 1013 at least includes an organic flat layer, the second interlayer insulating layer 1019 at least includes an inorganic insulating layer, the third electrode 1110 is the common electrode of each of the pixel units 1025, and an electric field is formed between the pixel electrode and the common electrode to drive the liquid crystal molecules in the liquid crystal layer 160 between the first substrate 101 and the second substrate 102 to deflect.

Figure 7:
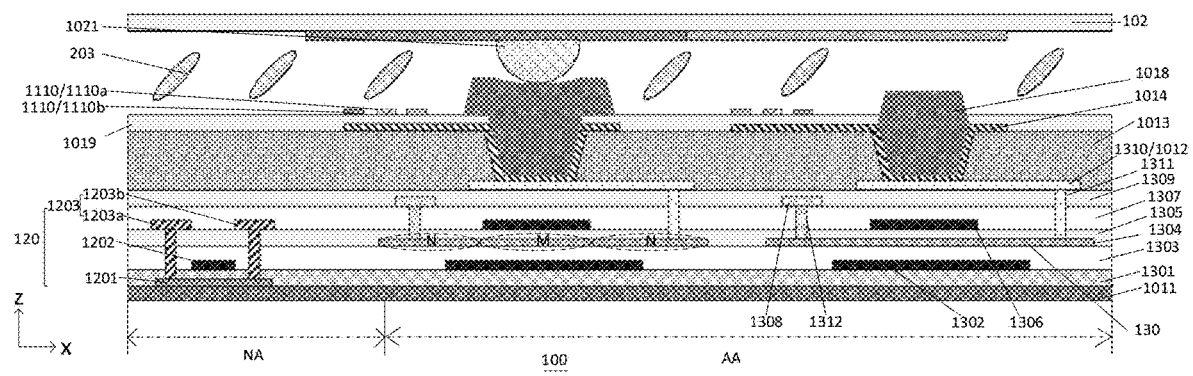
FIG. 7 is a schematic diagram of a cross-sectional structure of still another display panel provided by at least one embodiment of the present disclosure.

For example, FIG. 7 is a schematic diagram of a cross-sectional structure of still another display panel provided by at least one embodiment of the present disclosure. As shown in FIG. 7, for example, the thin film transistors in the display region of the display panel 100 are metal oxide thin film transistors, and the thin film transistors in the GOA region are LTPS or metal oxide thin film transistors.

For example, in some embodiments, the semiconductor layer of the thin film transistor on the first substrate 101 includes low temperature polysilicon and metal oxide semiconductor. The first substrate 101 further includes a driving transistor 120 and a switching transistor 130 provided on the base substrate 1011, the switching transistor 130 is provided in the display region AA, and the driving transistor 120 is provided in the peripheral region NA surrounding the display region AA.

For example, as shown in FIG. 7, the switching transistor 130 in the pixel unit region includes a first insulating layer 1301, a light-shielding layer 1302, a second insulating layer 1303, a metal oxide semiconductor layer 1304, a gate insulating layer 1305, a first gate electrode (gate line) 1306, a third insulating layer 1307, a first source electrode 1308, a fourth insulating layer 1309, and a first drain electrode 1310 that are sequentially stacked on the base substrate 1011, the first electrode 1012 is electrically connected to the metal oxide semiconductor layer 1304 through a fifth via hole 1311 penetrating through the fourth insulating layer 1309, the third insulating layer 1307, and the gate insulating layer 1305 sequentially to serve as the first drain electrode 1310, and the first source electrode 1308 is electrically connected to the metal oxide semiconductor layer 1304 through a seventh via hole 1312 penetrating through the third insulating layer 1307 and the gate insulating layer 1305 sequentially. The switching transistor 130 is configured to provide a turn-on voltage for driving the photoelectric medium of the display panel (e.g., the deflection of liquid crystal molecules), and the transparency of the metal oxide semiconductor layer 1304 in the switching transistor 130 can bring a high transmittance display effect, so that the display effect of the virtual reality technology is further improved.

For example, as shown in FIG. 7, the driving transistor 120 includes a second polysilicon layer 1204, a first insulating layer 1301, a second gate electrode (gate line) 1202, a second insulating layer 1303, a gate insulating layer 1305, and a source-drain electrode layer 1203 that are sequentially stacked on the base substrate 1011, the source-drain electrode layer 1203 includes a second source electrode 1203a and a second drain electrode 1203b, and the second source electrode 1203a and the second drain electrode 1203b are respectively connected to the second polysilicon layer 1204. The driving transistor 120 is configured to provide a driving voltage when the array substrate is used for display, and the driving transistor 120 uses the second polysilicon layer 1204 as a semiconductor layer to improve mobility and bring about the technical effect of a narrow frame. The second gate electrode 1202 and the light-shielding layer 1302 are arranged in the same layer, that is, the second gate electrode 1202 and the light-shielding layer 1302 are made of the same material, formed in the same process step, and formed on the same layer. For example, the second gate electrode 1202 and the light-shielding layer 1302 are made of materials with light-shielding properties and conductive properties, such as copper metal, molybdenum metal, etc., which are not limited in the embodiments of the present disclosure. The source-drain electrode layer 1203 and the first gate electrode 1306 are arranged in the same layer. For example, the source-drain electrode layer 1203 and the first gate electrode 1306 are made of the same material, formed in the same process step, and formed on the same layer. The second source electrode 1203a and the second drain electrode 1203b included in the source-drain electrode layer 1203 are respectively electrically connected to the second polysilicon layer 1204 through a connection hole, and the connection hole penetrates through the gate insulating layer 1305, the second insulating layer 1303, and the first insulating layer 1301 simultaneously.

For example, as shown in FIG. 7, the display panel 100 combines the technical effects of high mobility and narrow frame of the driving transistor 120 with the semiconductor layer made of the polysilicon material and the display effect of high transmittance of the switching transistor 130 with the semiconductor layer made of the metal oxide semiconductor material, which can further improve the display effect of virtual reality of the display panel.

For example, in FIG. 7, the third electrode 1110 includes metal oxide strip-shaped portions 1110a spaced apart from each other in the direction parallel to the main surface of the base substrate 1011, and metal portions 1110b between the metal oxide strip-shaped portions 1110a, and the materials of the metal oxide strip-shaped portion 1110a and the metal portions 1110b may refer to the above-mentioned related descriptions with respect to FIG. 4.

For example, as shown in FIG. 7, the region of the metal oxide semiconductor layer 1304 stacked with the first gate electrode 1306 is a channel region, that is, the region M marked by an ellipse dotted line, and the remaining region of the metal oxide semiconductor layer 1304 is a conductive region, that is, the region N marked by the ellipse dotted line. The ratio of the length of the channel region (region M) to the length of the conductive region (region N) is ⅕~¼ along the direction of the x-axis, for example, the length of the channel region (region M) is ⅕ or ¼ of the length of the conductive region (region N), etc., which are not limited in the embodiments of the present disclosure. In one example, the material of the channel region (region M) is indium gallium zinc oxide, which has semiconducting properties. The material of the conductive region (region N) is reduced indium gallium zinc oxide, which has conductor properties.

For example, as shown in FIG. 7, the orthographic projection of the first gate electrode 1306 on the base substrate 1011 at least partially overlaps with the orthographic projection of the light-shielding layer 1302 on the base substrate 1011. In one example, the orthographic projection of the first gate electrode 1306 on the base substrate 1011 is within the orthographic projection of the light-shielding layer 1302 on the base substrate 1011. In the direction perpendicular to the main surface of the base substrate 1011, the distance from the first gate electrode 1306 to the light-shielding layer 1302 is 0 μm~5 μm. For example, the orthographic projection of the channel region (region M) on the base substrate 1011 overlaps with the orthographic projection of the middle region of the light-shielding layer 1302 on the base substrate 1011, and the orthographic projection of the channel region (region M) on the base substrate 1011 is within the orthographic projection of the light-shielding layer 1302 on the base substrate 1011.

For example, in an example, the channel region (region M) is a double-layer structure or a triple-layer structure, and the compactness of the layer structure of the channel region (region M) away from the base substrate 1011 is greater than the compactness of the layer structure of the channel region (region M) close to the base substrate 1011.

For example, the material of the conductive region (region N) is different from the material of the channel region (region M), the material of the channel region (region M) includes oxygen element, indium element, gallium element, and zinc element, and the material of the conductive region N includes oxygen element, indium element, gallium element, zinc element, boron element, phosphorus element, or the like.

For example, in an example, the material of the metal oxide semiconductor layer 1304 is indium gallium zinc oxide (IGZO), and the portion of the metal oxide semiconductor layer 1304 connected to the first source electrode 1308 and the first drain electrode 1310 is conductorized, in this way, the portion of the metal oxide semiconductor layer 1304 other than the channel region (region M) can be better connected to the first source electrode 1308 and the first drain electrode 1310.

Figure 8:
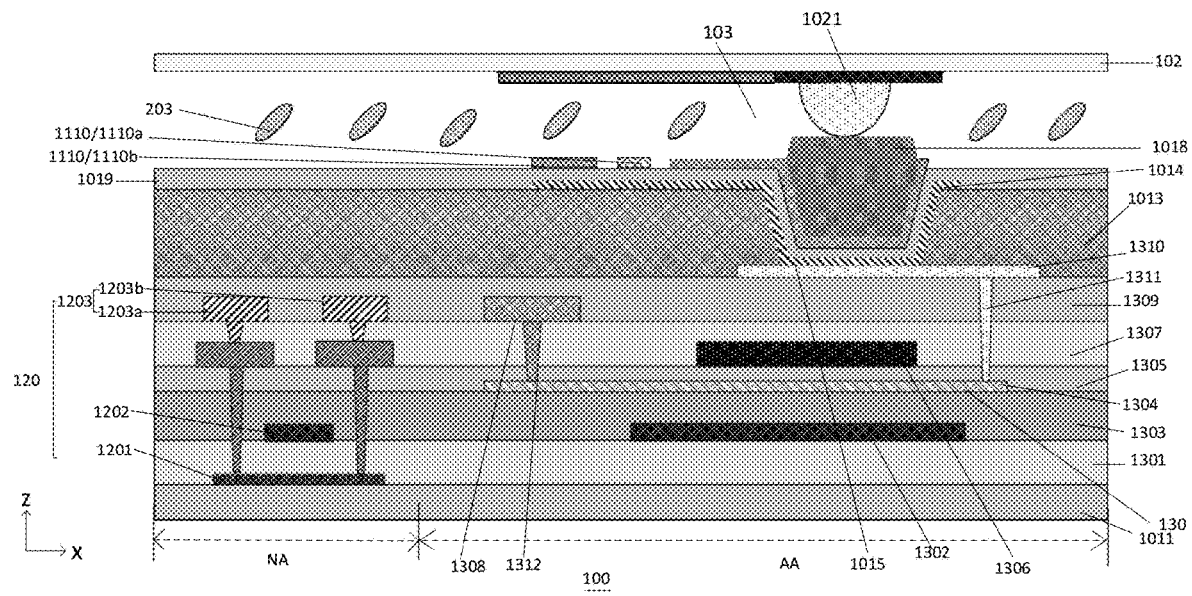
FIG. 8 is a schematic diagram of a cross-sectional structure of still another display panel provided by at least one embodiment of the present disclosure.

For example, FIG. 8 is a schematic diagram of a cross-sectional structure of still another display panel provided by at least one embodiment of the present disclosure. The difference between FIG. 8 and FIG. 7 is that in FIG. 8, the metal portion 1110b included in the third electrode 1110 extends into the first via hole 1015, so that the third electrode 1110 has more overlapping regions with the second electrode 1014. In FIG. 8, the second source electrode 1203a includes a source electrode base portion and a source electrode connection portion, and the second drain electrode 1203b includes a drain electrode base portion and a drain electrode connection portion. Both the source electrode base portion and the drain electrode base portion penetrate through the gate insulating layer 1305, the second insulating layer 1303, and the first insulating layer 1301, and are arranged in the same layer as the first gate electrode 1306. Both the source electrode connection portion and the drain electrode connection portion penetrate through the third insulating layer 1307, and are arranged in the same layer as the first source electrode 1308. The second source electrode 1203a and the second drain electrode 1203b are formed in two steps, which does not increase the number of process steps and reduces the difficulty of forming the connection hole, which can ensure the stability of the electrical connection between the second source electrode 1203a as well as the second drain electrode 1203b and the second polysilicon layer 1204.

Other structures of the display panel 100 shown in FIG. 8 may refer to the above-mentioned related descriptions with respect to FIG. 1, FIG. 3, FIG. 4, FIG. 5, and FIG. 7, which are omitted herein.

Figure 9:
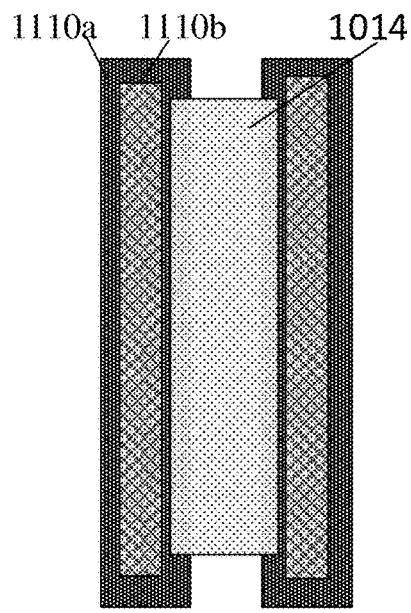
FIG. 9 is another perspective diagram of the second electrode and the third electrode provided by at least one embodiment of the present disclosure.
Figure 10:
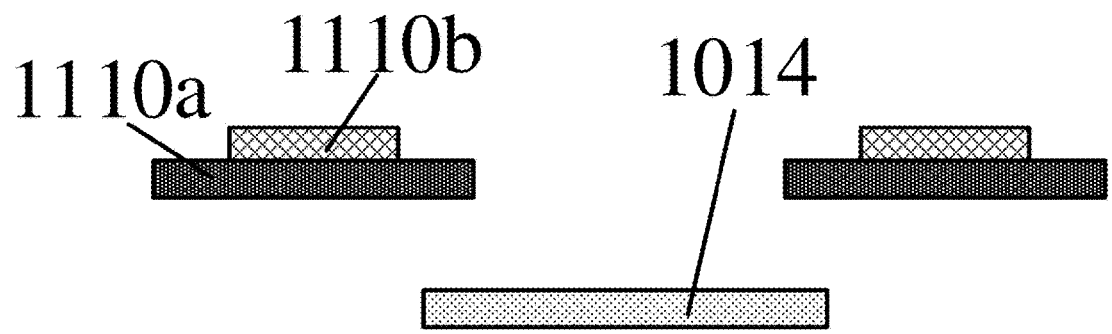
FIG. 10 is a schematic diagram of a cross-sectional structure of a structure shown in FIG. 9.

For example, FIG. 9 is another perspective diagram of the second electrode and the third electrode provided by at least one embodiment of the present disclosure, and FIG. 10 is a schematic diagram of a cross-sectional structure of the structure shown in FIG. 9. In combination with FIG. 9 and FIG. 10, the third electrode 1110 includes a metal oxide strip-shaped portion 1110a and a metal portion 1110b provided on a side of the metal oxide strip-shaped portion 1110a away from the base substrate 1011, that is, the metal oxide strip-shaped portion 1110a and the metal portion 1110b form a stacked structure, and the orthographic projection of the metal portion 1110b on the base substrate 1011 is located in the orthographic projection of the metal oxide strip-shaped portion 1110a on the base substrate 1011. The second electrode 1014 bridges between adjacent metal oxide strip-shaped portions 1110a, and the orthographic projection of the second electrode 1014 on the base substrate 1011 overlaps with the orthographic projection of the metal oxide strip-shaped portion 1110a on the base substrate 1011.

It should be noted that the third electrode 1110 may be formed of metal oxides or metals or alloys alone. The third electrode can be used as a common electrode, the second electrode 1014 can be used as a pixel electrode, and the common electrode and the pixel electrode form an electric field to drive the liquid crystal molecules. In addition, the third electrode 1110 is located in the same layer as the second electrode 1014, or the third electrode 1110 and the second electrode 1014 are located in different layers. For example, the metal portion of the third electrode 1110 is separated from the second electrode 1014 by a first insulating film, the metal oxide strip-shaped portion of the third electrode 1110 is separated from the second electrode 1014 by a second insulating film, and the metal portion of the third electrode 1110 is electrically connected to the metal oxide strip-shaped portion through via holes penetrating through the first insulating film and the second insulating film. Of course, the structure of the third electrode 1110 is not limited to this, for example, the display region of the third electrode 1110 is a mesh structure, or a slit-like structure or a plate-like structure.

Figure 11:
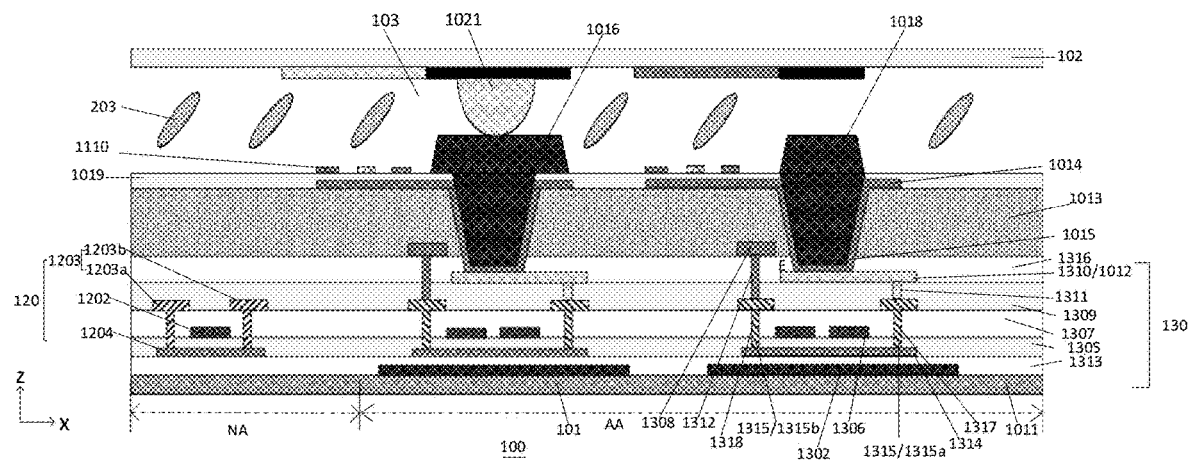
FIG. 11 is a schematic diagram of a cross-sectional structure of still another display panel provided by at least one embodiment of the present disclosure.

For example, FIG. 11 is a schematic diagram of a cross-sectional structure of still another display panel provided by at least one embodiment of the present disclosure.

As shown in FIG. 11, the channel layer on the first substrate 101 included in the display panel 100 is low temperature polysilicon (LTPS), and the first substrate 101 further includes a driving transistor 120 and a switching transistor 130 provided on the base substrate 1011. The switching transistor 130 is provided in the display region AA, and the driving transistor 120 is provided in the peripheral region NA surrounding the display region AA. The switching transistor 130 includes a light-shielding layer 1302, a buffer layer 1313, a first polysilicon layer 1314, a gate insulating layer 1305, a first gate electrode 1306, a third insulating layer 1307, a base electrode layer 1315, a fourth insulating layer 1309, a first drain electrode 1310, a fifth insulating layer 1316, and a first source electrode 1308 that are sequentially stacked on the base substrate 1011. The base electrode layer 1315 includes a first base electrode 1315a and a second base electrode 1315b provided opposite to each other, and the first electrode 1012 is electrically connected to the first base electrode 1315a through a fifth via hole 1311 penetrating through the fourth insulating layer 1309 to serve as the first drain electrode 1310. The first base electrode 1315a is electrically connected to the first polysilicon layer 1314 through a six via hole 1317 penetrating through the third insulating layer 1307 and the gate insulating layer 1305, the first source electrode 1308 is electrically connected to the second base electrode 1315b through a seventh via hole 1312 penetrating through the fifth insulating layer 1316 and the fourth insulating layer 1309 sequentially, and the second base electrode 1315b is electrically connected to the first polysilicon layer 1314 through an eighth via hole 1318 penetrating through the third insulating layer 1307 and the gate insulating layer 1305. The driving transistor 120 includes a buffer layer 1313, a second polysilicon layer 1204, a gate insulating layer 1305, a second gate electrode 1202, a third insulating layer 1307, and a source-drain electrode layer 1203 that are sequentially stacked on the base substrate 1011. The source-drain electrode layer 1203 includes a second source electrode 1203a and a second drain electrode 1203b, and both the second source electrode 1203a and the second drain electrode 1203b are electrically connected to the second polysilicon layer 1204. The first gate electrode 1306 and the second gate electrode 1202 are arranged at the same layer, and the source-drain electrode layer 1203 and the base electrode layer 1315 are arranged at the same layer. The low temperature polysilicon (LTPS) display panel uses the first polysilicon layer 1314 and the second polysilicon layer 1204 as semiconductor layers to improve mobility and bring about the technical effect of a narrow frame.

For example, as shown in FIG. 11, in the direction parallel to the main surface of the base substrate 1011, the contact portion of the first electrode 1012 and the second electrode 1014 is located between the fifth via hole 1311 and the seventh via hole 1312, and the orthographic projection of the contact portion of the first electrode 1012 and the second electrode 1014 on the base substrate 1011 at least partially overlaps with the orthographic projection of the first gate electrode 1306 on the base substrate 1011.

For example, as shown in FIG. 11, in the direction parallel to the main surface of the base substrate 1011, the distance between the side of the contact portion of the first electrode 1012 and the second electrode 1014 close to the fifth via hole 1311 and the sixth via hole 1317 is equal to the length of the first electrode 1012 not covering the first gate electrode 1306.

For example, as shown in FIG. 11, in the direction parallel to the main surface of the base substrate 1011, the end points of two ends of the light-shielding layer 1302 are located between the seventh via hole 1312 and the fifth via hole 1311, and the contact portion of the first electrode 1012 and the second electrode 1014 is located between the seventh via hole 1312 and an end point of the light-shielding layer 1302 close to the fifth via hole 1311.

For example, in FIG. 11, the first gate electrode 1306 includes two portions spaced apart from each other in the direction parallel to the main surface of the base substrate 1011, i.e., a double gate structure is formed.

For example, other structures of the display panel 100 shown in FIG. 11 may refer to related structures of conventional low temperature polysilicon (LTPS) display panels, which are not limited in the embodiments of the present disclosure.

For example, as shown in FIG. 7, FIG. 8 and FIG. 11, the pixel unit 1025 further includes a thin film transistor, the thin film transistor includes a switching transistor 130, and the thin film transistor 130 includes a semiconductor layer 1314, and a first source electrode 1308 and a first drain electrode 1310 arranged at intervals. The first source electrode 1308 and the first drain electrode 1310 are connected to the semiconductor layer 1314, the second electrode 1014 is the pixel electrode of the pixel unit 1025, and the first electrode 1012 is the first drain electrode 1310 or is used as a connection electrode for connecting the first drain electrode 1310 and the pixel electrode.

For example, as shown in FIG. 11, the material of the first drain electrode 1310 is a transparent conductive oxide. For example, the material of the first drain electrode 1310 includes a transparent metal oxide conductive material, such as indium tin oxide. The second electrode 1014 extends to the side of the first via hole 1015 close to the base substrate 1011, and the first drain electrode 1310 is in surface contact with the second electrode 1014, so that the connection between the first drain electrode 1310 and the second electrode 1014 is more stable, and the aperture ratio of the display panel 100 is not affected.

For example, in an example, the width d of the opening of the first via hole 1015 close to the upper surface of the first interlayer insulating layer 1013 satisfies: $d \leq (K1*M/PPI)*(1-AR*1/(1-D_{min}*PPI/M))$, and M is a constant value of 25400 μm. PPI is the pixel density, which is the amount of pixel units per inch, and 1 inch=25400 μm. The width of a single pixel unit is P=M/PPI=25400 μm/PPI, K1 is the aspect ratio of a single pixel unit, AR is the aperture ratio, PPI is the pixel density, and $D_{min}$ is the limit value of the exposure process.

For example, in an example, the width d of the opening of the first via hole 1015 close to the upper surface of the first interlayer insulating layer 1013 satisfies: $d \approx (K1*M/PPI)*(1-AR)$, PPI is the pixel density, K1 is the aspect ratio of a single pixel unit, and AR is the aperture ratio. And in the following derivation process. $W_{data}$ is the width of the data line, W gate is the width of the gate line, the width of a single pixel is P=M/PPI, and $D_{min}$ is the limit value of the exposure process, which is approximately equal to the width of the metal line, for example, equal to the width of the gate line.

In an example, the above formula $d \approx (K1*M/PPI)*(1-AR)$ is derived by the following process: M=25400, AR(Aperture Ratio)=$(P-W_{data})*(K1*P-d)/(P*K1*P)$, or AR (aperture ratio)=$(P-W_{gate})*(K1*P-d)/(P*K1*P)$.

Take the relationship between AR and $W_{gate}$ as an example, the formula AR (Aperture Ratio)=$(P-W_{gate})*(K1*P-d)/(P*K1*P)$ is transformed into the following scheme:
AR=$((1-W_{gate})/P)*(1-d/K1*P)=(1-(W_{gate}*PPI)/M)*(1-(d*PPI)/K1*M)$, $D_{min} \leq W_{gate}$, $D_{min} \leq W_{data}$; in practical applications, $D_{min}$ may be the smallest value among the actual measured values of the gate line or data line.

Derive: $d \leq (K1*M/PPI)*(1-AR*1/(1-D_{min}*PPI/M))$, $0.4 \leq AR \leq 0.8$, M=25400, PPI=1100~2500, K1=1.0~3, $D_{min}$=1.3–2.5 μm, $$D_{min} \leq W_{gate} \leq d \leq (K1*M/PPI)*(1-P/(1-D_{min}*PPI/M)).$$

That is: $d \sim (K1*M/PPI)*(1-P)$, the width d of the opening at the side of the first via hole 1015 away from the base substrate 1011 is proportional to K1, inversely proportional to the pixel density PPI, and inversely proportional to the transmittance.

The range of the limit value of the exposure process $D_{MIN}$ is 1.3 μm~2.5 μm, and the range obtained according to the formula $d \approx (K1*M/PPI)*(1-R)$ is d=2.0 μm~10 μm.

For example, in another example, $0.4 \leq AR \leq 0.7$, M=25400, PPI=1130~1500, K1=1.0~2.5, $D_{min}$=1.3~1.8, and d=3.0 μm~6.1 μm.

For example, $0.5 \leq AR \leq 0.65$, M=25400, PPI=1500~2000, K1=1.0~2.5, $D_{min}$=1.3~1.5, and d=4.5 μm~5.2 μm.

Furthermore, the design of the first via hole 1015 satisfies that the range of the absolute value of $(d1-d2)-\tan \beta1*d3$ is from 0 to 1.5, one example is: $d1-d2=\tan \beta1*d3$, where d1 is the width of the opening at the side of the first via hole 1015 away from the base substrate 1011, the width of the opening is the diameter measured at one position or the average value of widths of openings at different positions, d2 is the width of the opening at the side of the first via hole 1015 close to the base substrate 1011, the width of the opening is the width of the opening at one position or the average value of widths of openings at different positions, d3 is the thickness of the first interlayer insulating layer 1013 or the average thickness of multiple positions, and B1 is an included angle between the side surface of the first via hole 1015 and the horizontal plane of the base substrate 1011.

The width of the opening at the side of the first via hole 1015 away from the base substrate 1011 or the width of the opening at the side of the first via hole 1015 close to the base substrate 1011 is the width of the opening of the first support structure 1016, or is the width of the opening on the first interlayer insulating layer 1013.

The width of the opening at the side close to the base substrate 1011 is the width of the opening on the first interlayer insulating layer 1013, or is the width of the contact position between the first support structure 1016 and the first interlayer insulating layer 1013 or the width of the contact position between the first support structure 1016 and the second interlayer insulating layer 1019.

The width mentioned in the present disclosure is a width measured at one position or an average value of widths measured at a plurality of positions.

For example, in an example, d1−d2 is about 2.0 μm, which is less than or equal to the thickness of the portion of the first support structure 1016 protruding beyond the first via hole 1015.

Figure 12:
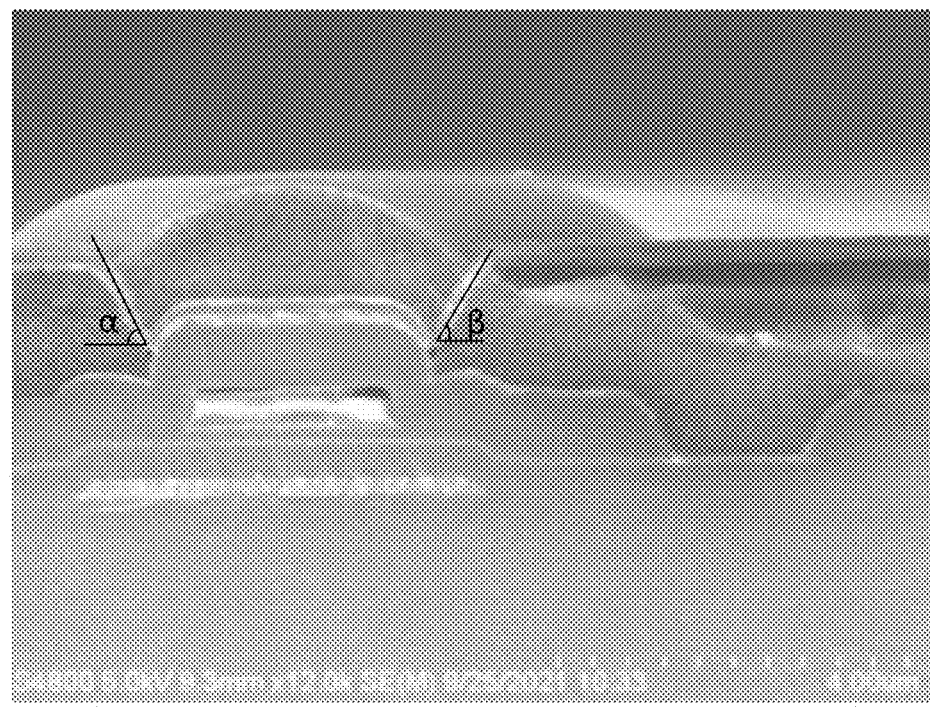
FIG. 12 is a scanning electron microscope image of a first support structure provided by at least one embodiment of the present disclosure.

For example, FIG. 12 is a scanning electron microscope image of the first support structure provided by at least one embodiment of the present disclosure. As shown in FIG. 12, in the direction perpendicular to the main surface of the base substrate 1011, the included angle formed by the surface of the first via hole 1015 close to the first source electrode 1308 and the horizontal plane is α, and the included angle formed by the surface of the first via hole 1015 close to the first drain electrode 1310 and the horizontal plane is β. In an example α≥β, and in another example α<β.

For example, in an example, α>β, and the range of the difference between α and β is 0.5~3°.

For example, in an example, $D_{min} \leq W_{gate} \leq d$, d=2.0 μm~10 μm, and $D_{min}$=1.5 μm~2 μm.

For example, in an example, the design of the first via hole 1015 satisfies $d1-d2=\tan \beta1*d3$, and d1−d2=2.0 μm, where the d1−d2 is less than or equal to the thickness of the portion of the first support structure 1016 protruding beyond the first via hole 1015, d1 is the width of the opening at the side of the first via hole 1015 away from the base substrate 1011, d2 is the width of the opening at the side of the first via hole 1015 close to the base substrate 1011, d3 is the thickness of the first interlayer insulating layer 1013, and β1 is the included angle between the side wall of the first via hole 1015 and the horizontal plane.

For example, in an example, α>β, and the range of the difference between α and β is 0.5~3°. In order to make the connection between the first electrode 1012 and the second electrode 1014 more stable, the first electrode 1012 extends right above the first gate electrode 1306, that is, the orthographic projection of the first electrode 1012 on the base substrate 1011 at least partially overlaps with the orthographic projection of the first gate electrode 1306 on the base substrate 1011.

For example, as shown in FIG. 12, the width of the right side of the first support structure 1016 extending beyond the first gate electrode 1306 is w1, the thickness of the first interlayer insulating layer 1013 is H1, and tan β=H1/w1.

After testing, the following conclusions are obtained: the minimum width $w1_{min}$ of the right side of the first support structure 1016 extending beyond the first gate electrode 1306 is 0.15 μm, the size of H1 is 2.41 μm, and the size of B is 84°. $w1_{max}$ is the maximum width of the right side of the first support structure 1016 extending beyond the first gate electrode 1306, the $w1_{max}$ is 2.0 μm, the size of H1 is 2.41 μm, and the size of β is 50°.

Figure 13:
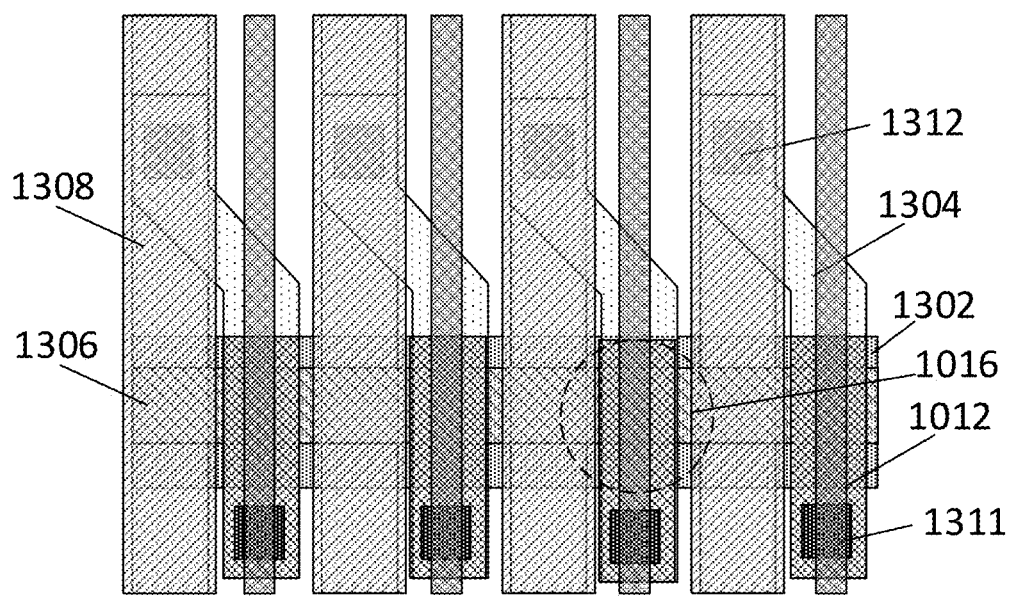
FIG. 13 is a schematic diagram of a perspective structure of a first substrate provided by at least one embodiment of the present disclosure.

For example, FIG. 13 is a schematic diagram of a perspective structure of a first substrate provided by at least one embodiment of the present disclosure. As shown in FIG. 13, the metal oxide semiconductor layer 1304 is electrically connected to the first electrode 1012 through the fifth via hole 1311, and the metal oxide semiconductor layer 1304 is electrically connected to the first source electrode 1308 through the seventh via hole 1312. The extending direction of the light-shielding layer 1302 is parallel to the direction perpendicular to the extending direction of the portion of the metal oxide semiconductor layer 1304 that is electrically connected to the first electrode 1012, and the orthographic projection of the light-shielding layer 1302 on the base substrate 1011 overlaps with the orthographic projection of the first gate electrode 1306 on the base substrate 1011. The portion shown by a dotted circle in FIG. 13 is the first support structure 1016. Combining FIG. 11 with FIG. 13, the orthographic projection of the contact portion of the first electrode 1012 and the second electrode 1014 on the base substrate 1011 is in the orthographic projection of the first gate electrode 1306 on the base substrate 1011.

For example, as shown in FIG. 11, in the direction parallel to the main surface of the base substrate 1011, the distance between the side of the contact portion of the first electrode 1012 and the second electrode 1014 close to the fifth via hole 1311, and the fifth via hole 1311 is equal to the length of the first electrode 1012 not covering the first gate electrode 1306.

For example, as shown in FIG. 11, in the direction parallel to the main surface of the base substrate 1011, a first contact portion E of the first electrode 1012 and the second electrode 1014 is located between the fifth via hole 1311 and the seventh via hole 1312, and the orthographic projection of the first contact portion E on the base substrate 1011 at least partially overlaps with the orthographic projection of the first gate electrode 1306 on the base substrate 1011. In the direction parallel to the main surface of the base substrate 1011, the end points of two ends of the light-shielding layer 1302 are located between the fifth via hole 1311 and the seventh via hole 1312, and the first contact portion E is located between the fifth via hole 1311 and the end point of the light-shielding layer 1302 close to the fourth via hole 1312.

For example, as shown in FIG. 11, the distance from the orthographic projection of the contact portion on the first gate electrode 1306 to the leftmost end of the first gate electrode 1306 is ⅕~⅓ of the total length of the first gate electrode 1306. The distance from the orthographic projection of the contact portion on the first gate electrode 1306 to the seventh via hole 1312 is equal to the length of the first electrode 1012 not covering the first gate electrode 1306.

For example, as shown in FIG. 11, the end point of the left end of the light-shielding layer 1302 is located at the left side of the left end point corresponding to the first gate electrode 1306, and the end point of the right end of the light-shielding layer 1302 is located at the right side of the right end point corresponding to the first gate electrode 1306, that is, the orthographic projection of the first gate electrode 1306 on the base substrate 1011 is located in the orthographic projection of the light-shielding layer 1302 on the base substrate 1011.

For example, the orthographic projection of the first contact portion on the base substrate 1011 is located between the orthographic projection of the end point of the left end of the light-shielding layer 1302 on the base substrate 1011 and the orthographic projection of the fifth via hole 1311 on the base substrate 1011.

For example, the distance from the orthographic projection of the end point of the left end of the light-shielding layer 1302 on the base substrate 1011 to the leftmost end of the first gate electrode 1306 is ⅕~⅓ of the total length of the light-shielding layer 1302.

For example, as shown in FIG. 11, the distance between the fifth via hole 1311 and the seventh via hole 1312 is equal to the distance from the end point of the right end of the light-shielding layer 1302 to the end point of the right end of the first gate electrode 1306.

For example, in an example, the distance between the fifth via hole 1311 and the seventh via hole 1312/the width of the pixel=1.8/6.2=0.29.

For example, in another example, the distance between the fifth via hole 1311 and the seventh via hole 1312/the width of the pixel=3.3/13.7=0.24.

For example, in an example, the overlapping area of the first electrode 1012 and the metal oxide semiconductor layer 1304 satisfies: $S \geq (S1*R1)/R_{max}$, where S1 and R1 are the area of the fifth via hole 1311 and the contact resistance of the fifth via hole 1311, respectively, $R_{max}$ is the maximum contact resistance that meets the characteristic requirements, $R_{max}$=2000 ohms, R1=100~200 ohms, then the ratio of the overlapping area S of the first electrode 1012 and the metal oxide semiconductor layer 1304 to the area of the fifth via hole 1311 is derived to satisfy: $S/S1 \geq 1/20 \sim 1/10$.

It should be noted that, from the viewpoint of resistance, it is expected that the first electrode 1012 and the metal oxide semiconductor layer 1304 are overlapped with each other on the entire surface, and the contact resistance is small, which is beneficial to the conduction characteristics of the switching transistor 130. The half-hole overlapping is the cause of the process deviation, and the coverage value of the fifth via hole 1311 and the metal oxide semiconductor layer 1304 in this direction should not be exceeded. The example of the half-hole overlapping may also be applied if it meets the resistance requirements.

For example, in an example, the first electrode 1012 is overlapped with the side of the metal oxide semiconductor layer 1304, and the length of the first electrode 1012 not covering the metal oxide semiconductor layer 1304 accounts for $1/4 \sim 1/30$ of the length of the metal oxide semiconductor layer 1304. For example, the length of the first electrode 1012 not covering the metal oxide semiconductor layer 1304 is 0.1 μm~0.3 μm, which accounts for $1/20 \sim 1/5$ of the length of the metal oxide semiconductor layer 1304.

For example, as shown in FIG. 11, in the direction parallel to the main surface of the base substrate 1011, the contact portion of the first electrode 1012 and the second electrode 1014 is located between the fifth via hole 1311 and the seventh via hole 1312, and the orthographic projection of the contact portion on the base substrate 1011 at least partially overlaps with the orthographic projection of the first gate electrode 1306 on the base substrate 1101.

For example, as shown in FIG. 11, in an example, the material of the first interlayer insulating layer 1013 is the same as the material of the first support structure 1016, and both the material of the first interlayer insulating layer 1013 and the material of the first support structure 1016 are light-transmitting materials. Because a portion of the first support structure 1016 needs to occupy the opening region, the first support structure 1016 is usually made of a transparent material, so that the portion of the first support structure 1016 occupying the opening region does not affect the aperture ratio.

Figure 14:
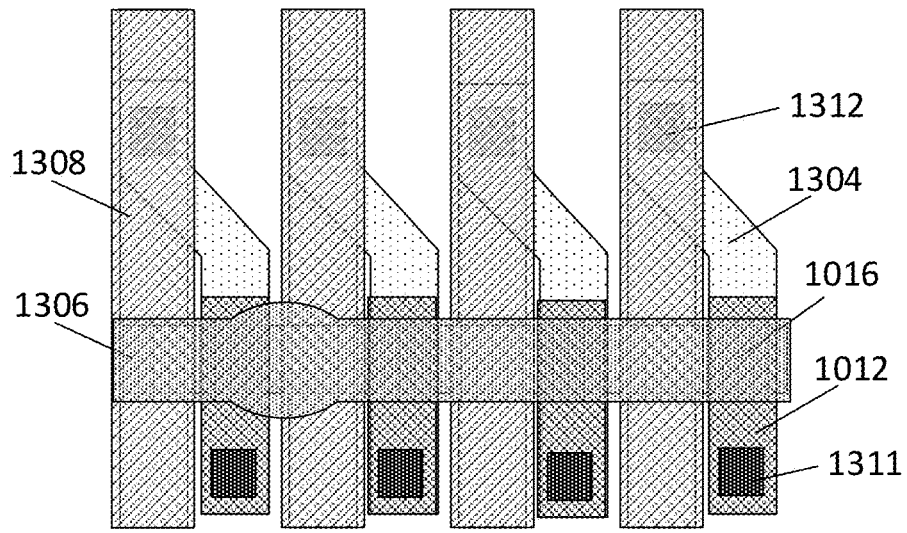
FIG. 14 is a schematic diagram of a perspective structure of another first substrate provided by at least one embodiment of the present disclosure.

For example, FIG. 14 is a schematic diagram of a perspective structure of another first substrate provided by at least one embodiment of the present disclosure. As shown in FIG. 14, the material of the first support structure 1016 is a light-shielding material, and the extending direction of the first support structure 1016 is parallel to the extending direction of the gate line, the extending directions of the gate line and the gate electrode 1306 are the same, that is, the extending direction of the first support structure 1016 is parallel to the extending direction of the gate electrode 1306. The first support structure 1016 is capable of blocking light so as to reduce the cross-color between adjacent pixels, and can further play a role of a horizontal black matrix, so that it is not necessary to fabricate the horizontal black matrix on the second substrate 102, but only the vertical black matrix needs to be fabricated, because the horizontal black matrix and the vertical black matrix are originally fabricated separately, thereby reducing the process steps on the second substrate 102.

In the above-mentioned embodiments of the present disclosure, as shown in FIG. 13, the gate line is a straight line with a constant line width and extends laterally, the gate line is located between two adjacent rows of pixel units, and there are two adjacent pixel regions in the same column of pixel units. It is assumed that the pixel unit in the previous row is a first pixel unit, and the pixel unit in the next row is a second pixel unit. The metal oxide semiconductor layer 1304 is a wiring extending from the region where the first pixel unit is located across the gate line to the second pixel unit. The overlapping region of the gate line and the metal oxide semiconductor layer is the gate electrode of the thin film transistor. The wiring extends from the data line region of the first pixel unit to the gate line and extends to the region corresponding to the fifth via hole in the second pixel unit.

The data line is in direct contact with the metal oxide semiconductor layer through the via hole below the data line, and a part of the data line is the source electrode of the TFT. A part of the gate line is the gate electrode of the TFT, and the present embodiment can maximize the aperture ratio of the pixel.

Figure 15:
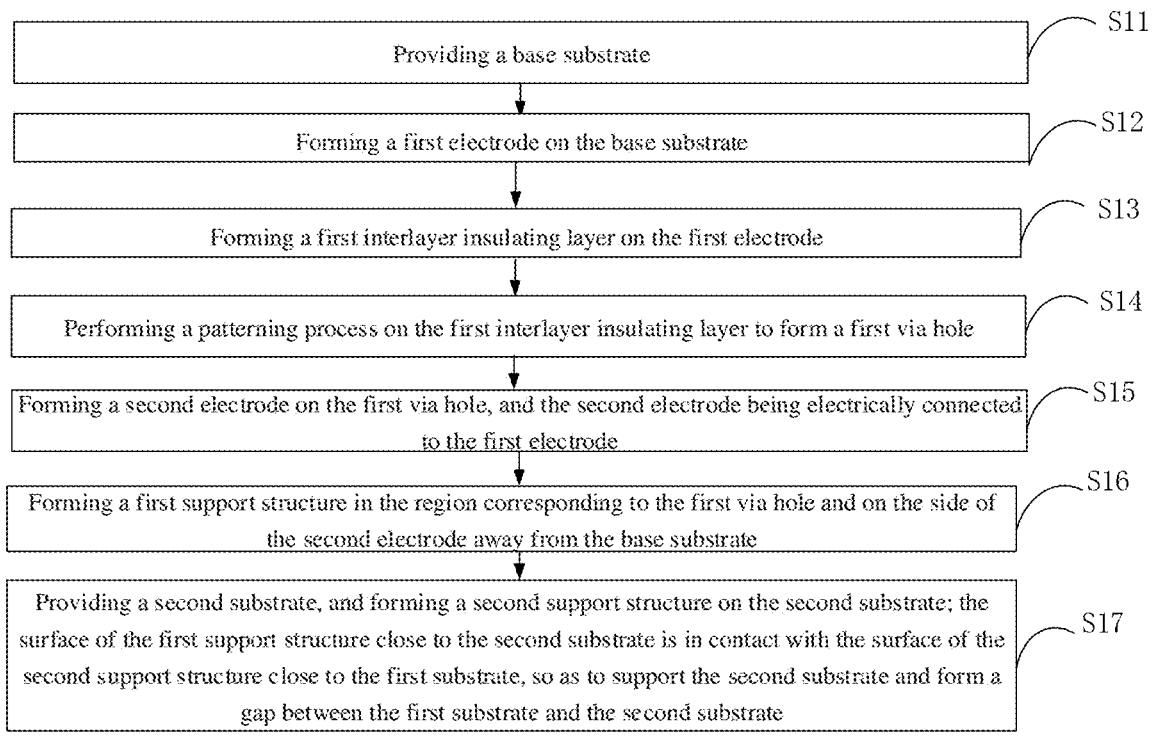
FIG. 15 is a process diagram of a method for manufacturing the display panel provided by at least one embodiment of the present disclosure.

At least one embodiment of the present disclosure further provides a method for manufacturing a display panel, for example, FIG. 15 is a process diagram of a method for manufacturing the display panel provided by at least one embodiment of the present disclosure. As shown in FIG. 15, the manufacturing method includes the following steps.

Step S11: providing a base substrate.

For example, the base substrate is a glass substrate, a flexible substrate, a silicon substrate, or the like, which is not limited in the embodiments of the present disclosure.

Step S12: forming a first electrode on the base substrate.

For example, the first electrode is a source/drain electrode of a thin film transistor, and the material of the first electrode is a transparent metal oxide, such as indium tin oxide or the like.

Step S13: forming a first interlayer insulating layer on the first electrode.

For example, the material of the first interlayer insulating layer is a light-transmitting inorganic material.

Step S14: performing a patterning process on the first interlayer insulating layer to form a first via hole.

For example, a conventional patterning process is used: coating photoresist, using a mask to shield the photoresist and irradiating the photoresist with ultraviolet rays to form a photoresist pattern, and using the photoresist pattern as a mask to etch the first interlayer insulating layer to form the first via hole.

Step S15: forming a second electrode on the first via hole, and the second electrode being electrically connected to the first electrode.

For example, the second electrode is a pixel electrode.

Step S16: forming a first support structure in the region corresponding to the first via hole and on the side of the second electrode away from the base substrate.

For example, the first support structure completely fills the first via hole and protrudes out of the first via hole, so as to avoid the problem of light leakage caused by the first via hole.

Step S17: providing a second substrate, and forming a second support structure on the second substrate; the surface of the first support structure close to the second substrate is in contact with the surface of the second support structure close to the first substrate, so as to support the second substrate and form a gap between the first substrate and the second substrate.

For example, the surface of the first support structure close to the second substrate is in contact with the surface of the second support structure close to the first substrate to support the second substrate and form a gap between the first substrate and the second substrate, so as to avoid scratches to the display region corresponding to the first substrate or to the display region corresponding to the second substrate during the process of the first substrate and the second substrate being oppositely combined with each other, thereby reducing the risk of edge light leakage.

For example, the structures of the first support structure and the second support structure refer to the related descriptions mentioned above, which will not be repeated here.

Figure 16:
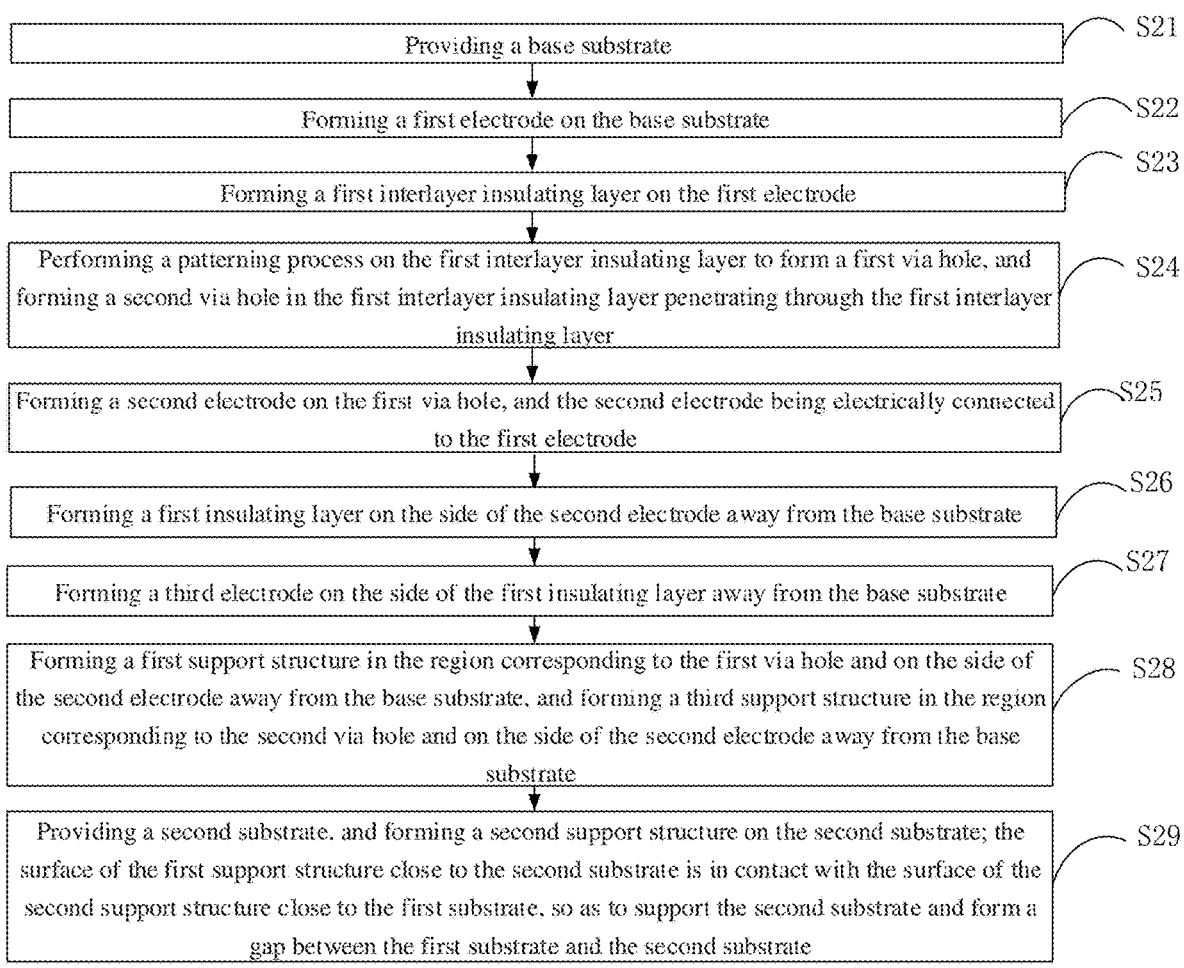
FIG. 16 is a process diagram of another method for manufacturing the display panel provided by at least one embodiment of the present disclosure.

For example, FIG. 16 is a process diagram of another method for manufacturing the display panel provided by at least one embodiment of the present disclosure. As shown in FIG. 16, the manufacturing method includes:

Step S21: providing a base substrate.

Step S22: forming a first electrode on the base substrate.

Step S23: forming a first interlayer insulating layer on the first electrode.

Step S24: performing a patterning process on the first interlayer insulating layer to form a first via hole, and forming a second via hole in the first interlayer insulating layer penetrating through the first interlayer insulating layer.

Step S25: forming a second electrode on the first via hole, and the second electrode being electrically connected to the first electrode.

Step S26: forming a first insulating layer on the side of the second electrode away from the base substrate.

Step S27: forming a third electrode on the side of the first insulating layer away from the base substrate.

For example, the third electrode includes metal oxide strip-shaped portions spaced apart from each other in a direction parallel to the main surface of the base substrate, and metal portions distributed between the metal oxide strip-shaped portions; or, the third electrode includes a metal layer and a metal oxide coating a side surface of the metal layer and a surface of the metal layer away from the base substrate, and the third electrode further includes a plurality of portions spaced apart from each other in the direction parallel to the main surface of the base substrate.

Step S28: forming a first support structure in the region corresponding to the first via hole and on the side of the second electrode away from the base substrate, and forming a third support structure in the region corresponding to the second via hole and on the side of the second electrode away from the base substrate.

For example, the orthographic projection of the third support structure on the base substrate does not overlap with the orthographic projection of the second support structure on the base substrate.

Step S29: providing a second substrate, and forming a second support structure on the second substrate; the surface of the first support structure close to the second substrate is in contact with the surface of the second support structure close to the first substrate, so as to support the second substrate and form a gap between the first substrate and the second substrate.

For example, the surface of the first support structure close to the second substrate is in contact with the surface of the second support structure close to the first substrate to support the second substrate and form a gap between the first substrate and the second substrate, so as to avoid scratches to the display region corresponding to the first substrate or to the display region corresponding to the second substrate during the process of the first substrate and the second substrate being oppositely combined with each other, thereby reducing the risk of edge light leakage.

For example, the structures of the first support structure and the second support structure refer to the related descriptions mentioned above, which are omitted herein.

Figure 17:
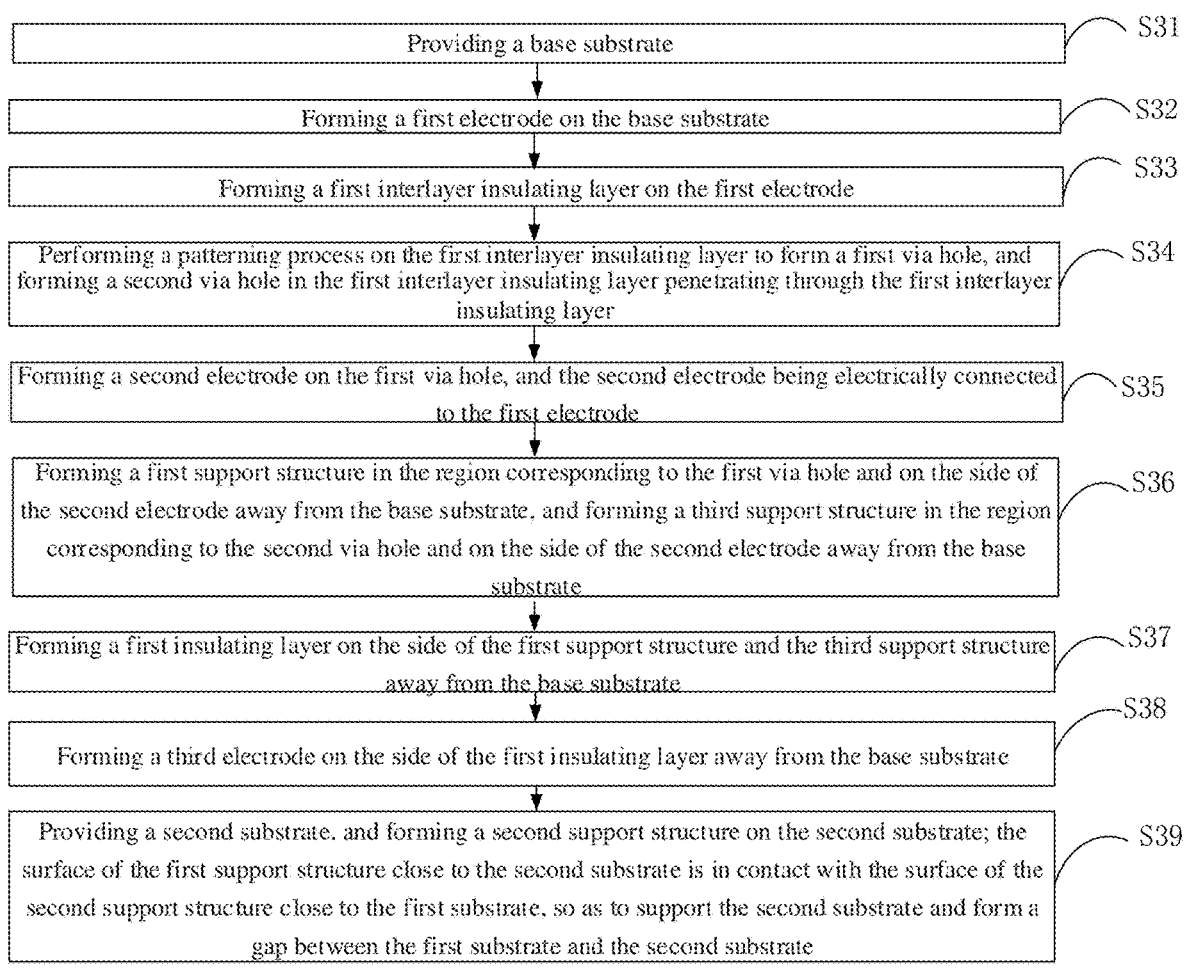
FIG. 17 is a process diagram of still another method for manufacturing the display panel provided by at least one embodiment of the present disclosure.

For example, FIG. 17 is a process diagram of still another method for manufacturing the display panel provided by at least one embodiment of the present disclosure. As shown in FIG. 17, the manufacturing method includes:

Step S31: providing a base substrate.

Step S32: forming a first electrode on the base substrate.

Step S33: forming a first interlayer insulating layer on the first electrode.

Step S34: performing a patterning process on the first interlayer insulating layer to form a first via hole, and forming a second via hole in the first interlayer insulating layer penetrating through the first interlayer insulating layer.

Step S35: forming a second electrode on the first via hole, and the second electrode being electrically connected to the first electrode.

Step S36: forming a first support structure in the region corresponding to the first via hole and on the side of the second electrode away from the base substrate, and forming a third support structure in the region corresponding to the second via hole and on the side of the second electrode away from the base substrate.

For example, the orthographic projection of the third support structure on the base substrate does not overlap with the orthographic projection of the second support structure on the base substrate. That is, the amount of the second support structures is smaller than the sum of the amount of the first support structures and the amount of the third support structures.

For example, the third support structure extends out of the second via hole in a direction perpendicular to the main surface of the base substrate, that is, extends out of the second via hole in a direction parallel to the z-axis, and the largest size of the third support structure in the direction parallel to the main surface of the base substrate is equal to the largest size of the second via hole in the direction parallel to the main surface of the base substrate. The third support structure can at least fill the second via hole, so as to reduce the risk of light leakage from the second via hole.

Step S37: forming a first insulating layer on the side of the first support structure and the third support structure away from the base substrate.

Step S38: forming a third electrode on the side of the first insulating layer away from the base substrate.

For example, the third electrode includes metal oxide strip-shaped portions spaced apart from each other in the direction parallel to the main surface of the base substrate, and metal portions distributed between the metal oxide strip-shaped portions; or, the third electrode includes a metal layer and metal oxide strip-shaped portions coating a side surface of the metal layer and a surface of the metal layer away from the base substrate, and the third electrode further includes a plurality of portions spaced apart from each other in the direction parallel to the main surface of the base substrate.

Step S39: providing a second substrate, and forming a second support structure on the second substrate; the surface of the first support structure close to the second substrate is in contact with the surface of the second support structure close to the first substrate, so as to support the second substrate and form a gap between the first substrate and the second substrate.

That is, the difference between FIG. 17 and FIG. 16 is: in FIG. 17, the first support structure and the third support structure are formed first, then the first insulating layer is formed, and then the third electrode is formed; and in FIG. 16, the first insulating layer is formed first, then the third electrode is formed, and then the first support structure and the third support structure are formed.

For example, structures such as the third electrode refer to the related descriptions mentioned above, which are omitted herein.

Figure 18:
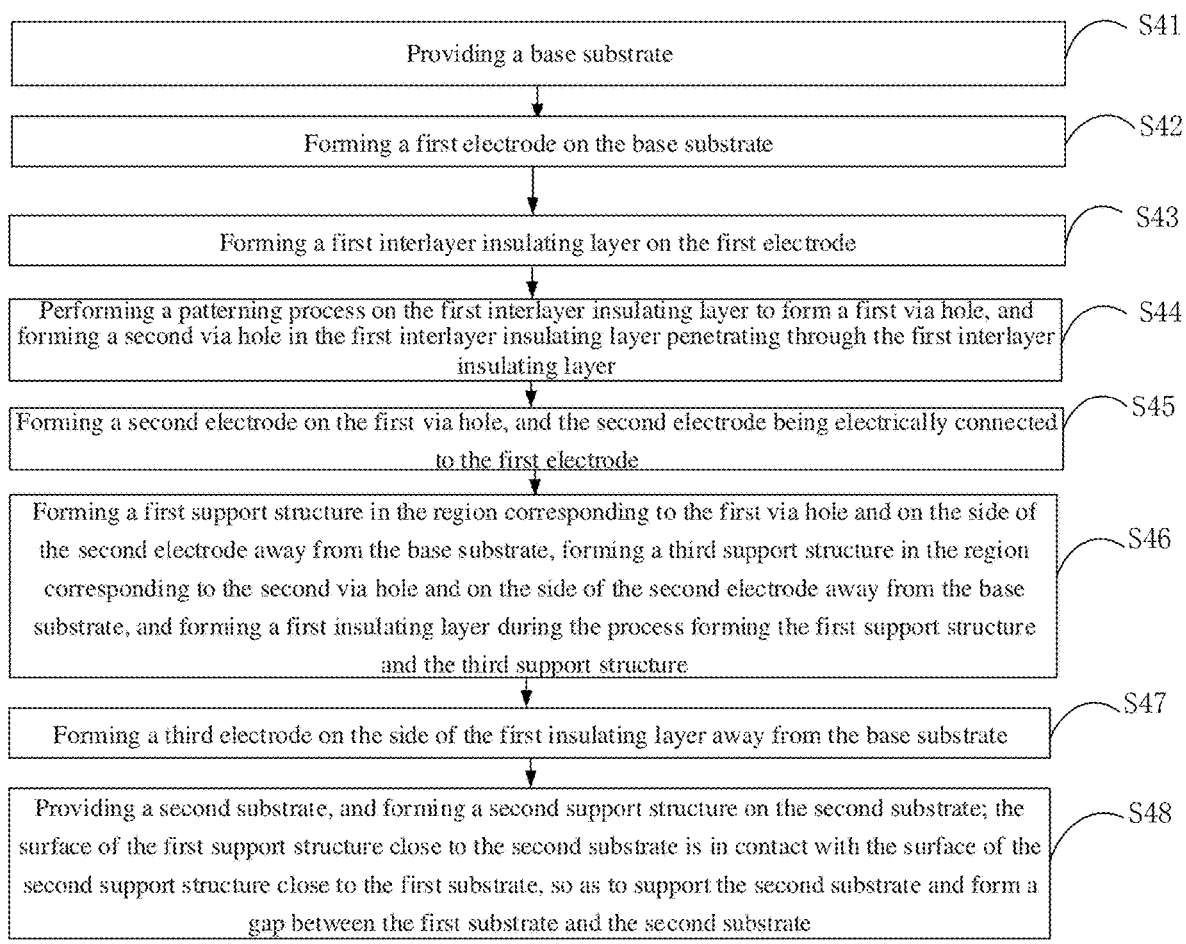
FIG. 18 is a process diagram of still another method for manufacturing the display panel provided by at least one embodiment of the present disclosure.

For example, FIG. 18 is a process diagram of still another method for manufacturing the display panel provided by at least one embodiment of the present disclosure. As shown in FIG. 18, the manufacturing method includes:

Step S41: providing a base substrate.

Step S42: forming a first electrode on the base substrate.

Step S43: forming a first interlayer insulating layer on the first electrode.

Step S44: performing a patterning process on the first interlayer insulating layer to form a first via hole, and forming a second via hole in the first interlayer insulating layer penetrating through the first interlayer insulating layer.

Step S45: forming a second electrode on the first via hole, and the second electrode being electrically connected to the first electrode.

Step S46: forming a first support structure in the region corresponding to the first via hole and on the side of the second electrode away from the base substrate, forming a third support structure in the region corresponding to the second via hole and on the side of the second electrode away from the base substrate, and forming a first insulating layer during the process forming the first support structure and the third support structure.

For example, the orthographic projection of the third support structure on the base substrate does not overlap with the orthographic projection of the second support structure on the base substrate.

For example, the first support structure, the third support structure and the first insulating layer are arranged at the same layer and made of the same material.

Step S47: forming a third electrode on the side of the first insulating layer away from the base substrate.

For example, the third electrode includes metal oxide strip-shaped portions spaced apart from each other in a direction parallel to the main surface of the base substrate, and metal portions distributed between the metal oxide strip-shaped portions; or, the third electrode includes a metal layer and a metal oxide coating a side surface of the metal layer and a surface of the metal layer away from the base substrate, and the third electrode further includes a plurality of portions spaced apart from each other in the direction parallel to the main surface of the base substrate.

For example, the first insulating layer is sandwiched between the second electrode and the third electrode, so that the second electrode corresponds to the third electrode at the surface of the first via hole or the second via hole close to the base substrate, thereby allowing the orthographic projection of the second electrode on the base substrate to be overlapped with the orthographic projection of the third electrode on the base substrate.

Step S48: providing a second substrate, and forming a second support structure on the second substrate; the surface of the first support structure close to the second substrate is in contact with the surface of the second support structure close to the first substrate, so as to support the second substrate and form a gap between the first substrate and the second substrate.

The display panel provided by at least one embodiment of the present disclosure has at least one of the following beneficial technical effects:

(1) The display panel provided by at least one embodiment of the present disclosure is formed by positioning at least part of the first support structure in the first via hole, and enabling that the orthographic projection of the first via hole on the base substrate at least partially overlaps with the orthographic projection of the gate line on the base substrate, so as to improve the resolution and aperture ratio of the display panel.

(2) In the display panel provided by at least one embodiment of the present disclosure, the first support structure is provided in the region corresponding to the first via hole included in the flat layer on the first substrate, the second support structure is provided on the second substrate, and the surface of the first support structure close to the second substrate is in contact with the surface of the second support structure close to the first substrate to support the second substrate and form a gap between the first substrate and the second substrate, so as to avoid scratches to the display region corresponding to the first substrate or to the display region corresponding to the second substrate during the process of the first substrate and the second substrate being oppositely combined with each other, thereby reducing the risk of edge light leakage.

(3) In the display panel provided by at least one embodiment of the present disclosure, because the first support structure is disposed in the region corresponding to the first via hole included in the flat layer, and the problem of light leakage caused by the first via hole is avoided.

(4) The display panel provided by at least one embodiment of the present disclosure combines the technical effects of high mobility and narrow frame of the driving transistor with polysilicon material as the semiconductor layer and the display effect of high transmittance of the switching transistor with metal oxide semiconductor material as the semiconductor layer, which can further improve the display effect of virtual reality of the display panel.

(5) In the display panel provided by at least one embodiment of the present disclosure, using the first polysilicon layer and the second polysilicon layer as semiconductor layers can improve the mobility and bring about the technical effect of the narrow frame.

The following statements should be noted:

(1) The accompanying drawings involve only the structure(s) in connection with the embodiment(s) of the present disclosure, and other structure(s) can be referred to common design(s).

(2) For the sake of clarity, in the accompanying drawings used to describe the embodiments of the present disclosure, the thickness of the layer or region is enlarged or reduced, i.e., these accompanying drawings are not drawn to the actual scale.

(3) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A display panel, comprising:
a first substrate and a second substrate that are oppositely combined with each other, wherein the first substrate comprises a base substrate, and a gate line, a first electrode, a first interlayer insulating layer, and a second electrode sequentially disposed on the base substrate;
the first interlayer insulating layer comprises a first via hole penetrating through the first interlayer insulating layer, the second electrode is electrically connected to the first electrode through the first via hole, and a first support structure is provided in a region corresponding to the first via hole and on a side of the second electrode away from the base substrate; and
at least a part of the first support structure is located in the first via hole, and an orthographic projection of the first via hole on the base substrate at least partially overlaps with an orthographic projection of the gate line on the base substrate wherein the first substrate is an array substrate, and the array substrate comprises the gate lines and data lines that are provided to be intersected with each other horizontally and vertically on the base substrate, and a plurality of pixel units; each of the plurality of pixel units comprises the first electrode, the second electrode, and the first interlayer insulating layer; the second electrode is in contact with a surface of the first interlayer insulating layer away from the base substrate, and the second electrode extends from an upper surface of the first interlayer insulating layer to a sidewall and a lower opening region of the first via hole and is connected to the first electrode located in the lower opening region; wherein a width d of an opening of the first via hole close to the upper surface of the first interlayer insulating layer satisfies: $d \leq (K1*M/PPI)*(1-AR*1/(1-D_{min}*PPI/M))$, and M is a constant value of 25400 μm; PPI is a pixel density, the pixel density is an amount of pixel units per inch, and 1 inch=25400 μm; a width of a single pixel unit is P=M/PPI=25400 μm/PPI, K1 is an aspect ratio of the single pixel unit, AR is an aperture ratio, and $D_{min}$ is a limit value of an exposure process.

2. The display panel according to claim 1, wherein the first interlayer insulating layer at least comprises a planarization layer, and the first via hole penetrates through the planarization layer.

3. The display panel according to claim 1, wherein a surface of the first support structure close to the second substrate is a plane or a concave surface recessed toward a side of the base substrate.

4. The display panel according to claim 3, wherein the first support structure extends downward within the first via hole to a lower opening region of the first via hole.

5. The display panel according to claim 1, wherein the first support structure extends upward within the first via hole to an upper opening region of the first via hole, and a top of the first support structure is higher than the upper surface of the first interlayer insulating layer.

6. The display panel according to claim 5, wherein each of the pixel units further comprises a third electrode located above the upper surface of the first interlayer insulating layer, and a second interlayer insulating layer is arranged between the third electrode and the second electrode on the upper surface of the first interlayer insulating layer; and the second interlayer insulating layer comprises an opening penetrating with the first interlayer insulating layer, and the first support structure extends toward the second substrate and comprises a protruding structure higher than the second interlayer insulating layer.

7. The display panel according to claim 6, wherein the third electrode comprises metal oxide strip-shaped portions spaced apart from each other on an upper surface of the second interlayer insulating layer, and a metal portion distributed between the metal oxide strip-shaped portions.

8. The display panel according to claim 6, wherein the third electrode comprises a metal portion and a metal oxide strip-shaped portion covering both a side surface and an upper surface of the metal portion, and the third electrode comprises a plurality of portions spaced apart from each other in a direction parallel to a main surface of the base substrate.

9. The display panel according to claim 1, wherein the width d of the opening of the first via hole close to the upper surface of the first interlayer insulating layer satisfies: $d \approx (K1*M/PPI)*(1-AR)$.

10. The display panel according to claim 1, further comprising a thin film transistor, wherein the thin film transistor comprises a source electrode and a drain electrode that are spaced apart from each other; and in a direction perpendicular to a main surface of the base substrate, an angle formed between an edge of the first via hole close to the source electrode and a plane where the main surface of the base substrate is located is α, an angle formed between an edge of the first via hole close to the drain electrode and the plane where the main surface of the base substrate is located is β, and $\alpha \geq \beta$.

11. The display panel according to claim 1, wherein $D_{min} \leq W_{gate} \leq d$, d=2.0 μm~10 μm, and $D_{min}$=1.5 μm~2 μm.

12. The display panel according to claim 10, wherein a design of the first via hole satisfies that a range of an absolute value of (d1−d2)−tan β1*d3 is from 0 to 1.5, d1 is a width of an opening of the first via hole away from a side of the base substrate, d2 is a width of an opening of the first via hole close to a side of the base substrate, d3 is a thickness of the first interlayer insulating layer, and β1 is an angle between the sidewall of the first via hole and a surface of the base substrate parallel to the horizontal plane.

13. The display panel according to claim 1, wherein a second support structure is disposed on the second substrate, and a surface of the first support structure close to the second substrate is in contact with a surface of the second support structure close to the first substrate, or the surface of the first support structure close to the second substrate maintains a set distance from the surface of the second support structure close to the first substrate.

14. The display panel according to claim 13, wherein an orthographic projection of the second support structure on the base substrate at least partially overlaps with an orthographic projection of the first support structure on the base substrate.

15. The display panel according to claim 13, wherein an area of a contact surface between the second support structure and the first support structure is smaller than an area of a cross-section of a region of the second support structure or an area of a cross-section of a region of the first support structure close to the base substrate.

16. The display panel according to claim 13, wherein the first interlayer insulating layer comprises a second via hole penetrating through the first interlayer insulating layer, a third support structure is disposed in the second via hole, and an orthographic projection of the third support structure on the base substrate does not overlap with an orthographic projection of the second support structure on the base substrate.

17. The display panel according to claim 16, wherein the third support structure extends away from the base substrate to outside of the second via hole, and the third support structure fills the second via hole to allow that a shape of the third support structure in the second via hole conforms to a shape of the second via hole.

18. The display panel according to claim 13, wherein a yield strength of the second support structure is greater than a product of an oppositely combined pressure when the first substrate and the second substrate are oppositely combined with each other and an area of a single second support structure and an amount of the second support structure.

* * * * *

UNITED STATES PATENT AND TRADEMARK OFFICE
CERTIFICATE OF CORRECTION

| | | |
|---|---|---|
| PATENT NO. | : 12,276,890 B2 | Page 1 of 1 |
| APPLICATION NO. | : 18/005421 | |
| DATED | : April 15, 2025 | |
| INVENTOR(S) | : Binbin Tong et al. | |

It is certified that error appears in the above-identified patent and that said Letters Patent is hereby corrected as shown below:

In the Claims

Claim 1, Column 34, Line 66:
Delete "substrate wherein" and insert --substrate; ¶ wherein--

Claim 10, Column 36, Line 8:
Delete "located is a" and insert --located is α--

Signed and Sealed this
Thirtieth Day of September, 2025

John A. Squires
*Director of the United States Patent and Trademark Office*